(12) United States Patent
Newcomb

(10) Patent No.: US 9,920,648 B2
(45) Date of Patent: Mar. 20, 2018

(54) CONCENTRIC THREE CHAMBER HEAT EXCHANGER

(71) Applicant: Eric William Newcomb, Harrison, ME (US)

(72) Inventor: Eric William Newcomb, Harrison, ME (US)

(*) Notice: Subject to any disclaimer, the term of this patent is extended or adjusted under 35 U.S.C. 154(b) by 101 days.

(21) Appl. No.: 14/444,636

(22) Filed: Jul. 28, 2014

(65) Prior Publication Data
US 2014/0353975 A1    Dec. 4, 2014

Related U.S. Application Data

(63) Continuation-in-part of application No. 13/956,897, filed on Aug. 1, 2013, now abandoned, and a continuation-in-part of application No. 13/573,882, filed on Oct. 12, 2012, now abandoned, and a continuation-in-part of application No. 13/507,331, filed on Jun. 21, 2012, now abandoned, and a
(Continued)

(51) Int. Cl.
| | |
|---|---|
| F03G 7/06 | (2006.01) |
| F01D 15/10 | (2006.01) |
| F03D 9/00 | (2016.01) |
| F01D 15/00 | (2006.01) |
| F02G 5/00 | (2006.01) |
| F02C 6/18 | (2006.01) |
| H02N 10/00 | (2006.01) |

(52) U.S. Cl.
CPC ............ *F01D 15/10* (2013.01); *F01D 15/00* (2013.01); *F02C 6/18* (2013.01); *F02G 5/00* (2013.01); *F03D 9/00* (2013.01); *F03D 9/007* (2013.01); *F03G 7/06* (2013.01); *H02N 10/00* (2013.01); *F05D 2220/76* (2013.01); *F05D 2250/82* (2013.01); *Y02E 10/465* (2013.01); *Y02E 10/72* (2013.01); *Y02E 20/14* (2013.01); *Y02T 10/166* (2013.01)

(58) Field of Classification Search
CPC . F01D 15/00; F01D 15/10; F02C 6/18; F02G 5/00; F03D 9/00; F03D 9/007; F03G 7/06; F05D 2220/76; F05D 2250/82; H02N 10/00; Y02E 10/465; Y02E 10/72; Y02E 20/14; Y02T 10/166
See application file for complete search history.

(56) References Cited

U.S. PATENT DOCUMENTS

| | | | | |
|---|---|---|---|---|
| 2,578,550 | A | * | 12/1951 | Holm ...................... F28D 7/103 165/141 |
| 3,323,585 | A | * | 6/1967 | Cannon ................... F28D 7/022 138/114 |

(Continued)

FOREIGN PATENT DOCUMENTS

WO    WO 2011/024928 A1    3/2011

OTHER PUBLICATIONS

Rockwell Automation Publication 1769-IN070C-EN-P—May 2008, 48 pages.
(Continued)

*Primary Examiner* — Julio Gonzalez
*Assistant Examiner* — S. Mikailoff

(57) ABSTRACT

System, method and apparatus providing power generation and demand management using a thermal hydraulic generator. Also a more efficient (full time cycle) and stable thermal hydraulic generators and heat exchangers are disclosed.

11 Claims, 19 Drawing Sheets

Related U.S. Application Data continuation-in-part of application No. 13/134,343, filed on Sep. 7, 2011, now abandoned.

(56) References Cited

U.S. PATENT DOCUMENTS

| | | | | |
|---|---|---|---|---|
| 3,651,551 | A * | 3/1972 | Cannon | B21D 53/06 165/141 |
| 4,228,848 | A * | 10/1980 | Wadkinson, Jr. | F28F 1/003 165/134.1 |
| 4,362,482 | A * | 12/1982 | Rutledge | B29C 44/3442 137/340 |
| 4,560,334 | A * | 12/1985 | Rutledge | B29C 44/3442 137/340 |
| 4,848,445 | A * | 7/1989 | Harper | F28D 15/00 165/104.19 |
| 4,994,684 | A | 2/1991 | Lauw et al. | |
| 5,157,935 | A * | 10/1992 | Gregory | F25B 5/02 165/154 |
| 5,899,067 | A | 5/1999 | Hageman | |
| 5,916,140 | A | 6/1999 | Hageman | |
| 6,265,786 | B1 | 7/2001 | Bosley et al. | |
| 6,281,601 | B1 | 8/2001 | Edelman et al. | |
| 6,390,185 | B1 * | 5/2002 | Proeschel | F28D 7/103 165/141 |
| 6,404,655 | B1 | 6/2002 | Welches | |
| 6,601,391 | B2 | 8/2003 | Alexander | |
| 6,943,461 | B2 | 9/2005 | Kaploun | |
| 8,099,198 | B2 | 1/2012 | Gurin | |
| 8,132,409 | B2 | 3/2012 | Orosz et al. | |
| 8,829,698 | B2 | 9/2014 | Koeneman et al. | |
| 2002/0030364 | A1 | 3/2002 | Bosley et al. | |
| 2003/0005697 | A1 | 1/2003 | Alexander | |
| 2003/0227172 | A1 | 12/2003 | Erdman et al. | |
| 2005/0116474 | A1 | 6/2005 | Edelson | |
| 2005/0140142 | A1 | 6/2005 | Welches et al. | |
| 2006/0066113 | A1 | 3/2006 | Ebrahim et al. | |
| 2007/0013190 | A1 | 1/2007 | Al-Khayat et al. | |
| 2007/0246943 | A1 | 10/2007 | Chang et al. | |
| 2008/0211230 | A1 | 9/2008 | Gurin | |
| 2008/0289334 | A1 | 11/2008 | Orosz et al. | |
| 2009/0140576 | A1 | 6/2009 | Yu et al. | |
| 2009/0179429 | A1 | 7/2009 | Ellis et al. | |
| 2009/0302616 | A1 | 12/2009 | Peterson | |
| 2009/0321040 | A1 | 12/2009 | Poitras | |
| 2010/0071366 | A1 | 3/2010 | Klemencic | |
| 2010/0089060 | A1 | 4/2010 | Ferguson et al. | |
| 2010/0300663 | A1 * | 12/2010 | Tso | F25B 39/00 165/135 |
| 2011/0005470 | A1 * | 1/2011 | Kato | F22B 7/02 122/235.14 |
| 2011/0155356 | A1 * | 6/2011 | Woo | F25B 7/00 165/141 |
| 2011/0215652 | A1 | 9/2011 | Gengenbach et al. | |
| 2011/0216562 | A1 | 9/2011 | Gengenbach | |
| 2012/0222845 | A1 * | 9/2012 | Kinder | F28F 13/12 165/154 |
| 2013/0056993 | A1 | 3/2013 | Newcomb | |
| 2013/0101873 | A1 | 4/2013 | Dionne et al. | |

OTHER PUBLICATIONS

Rockwell Automation Publication 1769-IN006B-EN-P (undated), 16 pages.

Rockwell Automation Publication 1769-IN062A-3N-P—Dec. 2001, 20 pages.

Rockwell Automation Publication 1769-IN067B-EN-P—Sep. 2005, 32 pages.

Rockwell Automation Publication 1769-IN065C-EN-P—Jun. 2010, 32 pages.

Rockwell Automation Publication 1769-IN027A-EN-P—Feb. 2001, 24 pages.

Rockwell Automation Publication 2711P-IN002G-EN-P—Nov. 2009, 32 pages.

\* cited by examiner

TABLE 1.A POWERFLEX 70 FRAMES

| OUTPUT POWER | | FRAME SIZE | | | | | | | | |
|---|---|---|---|---|---|---|---|---|---|---|
| | | 208-240V AC INPUT | | 400-480V AC INPUT | | | | 600V AC INPUT | | |
| kW ND (HD) | HP ND (HD) | NOT FILTERED | FILTERED | IP66 (4X/12) | NOT FILTERED | FILTERED | IP66 (4X/12) | NOT FILTERED | FILTERED | IP66 (4X/12) |
| .37 (0.25) | .5 (0.33) | A | B | B | A | B | B | A | - | B |
| 0.75 (0.55) | 1 (0.75) | A | B | B | A | B | B | A | - | B |
| 1.5 (1.1) | 2 (1.5) | B | B | B | A | B | B | A | - | B |
| 2.2 (1.5) | 3 (2) | B | B | B | B | B | B | B | - | B |
| 4 (3) | 5 (3) | - | C | D | B | C | B | B | - | D |
| 5.5 (4) | 7.5 (5) | - | D | D | - | C | D | C | - | D |
| 7.5 (5.5) | 10 (7.5) | - | D | D | - | D | D | C | - | D |
| 11 (7.5) | 15 (10) | - | - | - | - | D | D | D | - | D |
| 15 (11) | 20 (15) | - | - | - | - | D | D | D | - | D |
| 18.5 (15) | 25 (20) | - | - | - | - | D | D | - | - | - |
| 22 (18.5) | 30 (25) | - | - | - | - | D | D | - | - | - |

FIG. 9A
PRIOR ART

DIMENSIONS ARE IN MILLIMETERS AND (INCHES).

| FRAME | A | B | C | D | E | WEIGHT[1] kg (lbs.) |
|---|---|---|---|---|---|---|
| IP20 / NEMA TYPE 1 | | | | | | |
| A | 122.4 (4.82) | 225.7 (8.89) | 179.8 (7.08) | 94.2 (3.71) | 211.6 (8.33) | 2.71 (6.0) |
| B | 171.7 (6.76) | 234.8 (9.24) | 179.8 (7.08) | 122.7 (4.83) | 220.2 (11.25) | 3.60 (7.9) |
| C | 185.0 (7.28) | 300.0 (11.81) | 179.8 (7.08) | 137.6 (5.42) | 285.6 (11.25) | 6.89 (15.2) |
| D | 219.9 (8.66) | 350.0 (13.78) | 179.8 (7.08) | 169.0 (6.65) | 335.6 (13.21) | 9.25 (20.4) |
| IP66 / NEMA TYPE 4X/12 | | | | | | |
| B | 171.7 (6.76) | 239.8 (9.44) | 203.3 (8.00) | 122.7 (4.83) | 220.2 (8.67) | 3.61 (8.0) |
| D | 219.9 (8.66) | 350.0 (13.78) | 210.7 (8.29) | 169.0 (6.65) | 335.6 (13.21) | 9.25 (20.1) |
| FLANGE MOUNT | | | | | | |
| A | 156.0 (6.14) | 225.8 (8.89) | 178.8 (7.08) | - | - | 2.71 (6.0) |
| B | 205.2 (8.08) | 234.6 (9.24) | 178.8 (7.08) | - | - | 3.60 (7.9) |
| C | 219.0 (8.62) | 300.0 (11.81) | 178.8 (7.08) | - | - | 6.89 (15.2) |
| D | 248.4 (3.78) | 350.0 (13.78) | 178.8 (7.08) | - | - | 9.25 (20.4) |

(1) WEIGHTS INCLUDE HIM AND STANDARD I/O.

CONCENTRIC THREE CHAMBER HEAT EXCHANGER

CROSS REFERENCE TO RELATED APPLICATIONS

This application is a continuation-in-part of application Ser. No. 13/956,897, filed on Aug. 1, 2013, a continuation-in-part of application Ser. No. 13/134,343, filed on Sep. 7, 2011, a continuation-in-part of application Ser. No. 13/507,331, filed on Jan. 21, 2012, now abandoned, and a continuation-in-part of application Ser. No. 13/573,882, filed on Oct. 12, 2012, now abandoned.

FIELD OF THE INVENTION

The invention relates to the field of power generation and, more particularly but not exclusively, power generation systems using a Thermal Hydraulic Generator.

BACKGROUND

Thermal Hydraulic Generators capture energy from Turbine Generators, Combustion Engines, Geothermal Sources, Facility Systems, or Solar Collectors. These sources can be used to produce 180-degree Fahrenheit hot water in order to drive Thermal Hydraulic Generators. These Generators create a very efficient means of generating electric power.

SUMMARY

Various deficiencies in the prior art are addressed by systems and apparatus providing power generation and demand management using a thermal hydraulic DC generator. Various embodiments comprise a thermal hydraulic DC generator, thermal hydraulic induction generator and/or thermal hydraulic signals generator, for generating output power in response to a control signal; a power conditioner for converting the output power into AC power for use by an electrical load; and a controller, for adapting the control signal in response to an electrical system load demand associated with the electrical load, the control signal being adapted to cause the thermal hydraulic generator to adapt its output power such that the power conditioner satisfies the electrical system load demand. Also a more efficient (full time cycle) and stable thermal hydraulic generators and heat exchangers are disclosed.

BRIEF DESCRIPTION OF THE DRAWINGS

The teachings of the present invention can be readily understood by considering the following detailed description in conjunction with the accompanying drawings, in which:

FIGS. 9A, 9B, 9C and 9D graphically depict physical dimensions for various VFDs suitable for providing circulation pump control functionality in the system of FIG. 1 in cooperation with the PLC of FIG. 2;

To facilitate understanding, identical reference numerals have been used, where possible, to designate identical elements that are common to the figures.

DETAILED DESCRIPTION

Thermal Hydraulic DC Generators capture energy from Turbine Generators, Combustion Engines, Geothermal Sources, Facility Systems, or Solar Collectors. These sources can be used to produce 180-degree Fahrenheit hot water in order to drive Thermal Hydraulic DC Generators. These Generators create a very efficient means of generating electric power.

Other co-generation systems require the use of steam to drive Steam Turbines. The use of steam as opposed to hot water requires more expensive equipment and more maintenance to operate than a 180 Degree F. hot water system. These 180 Degree F. hot water systems incorporating the Thermal Hydraulic DC Generators are more efficient than the Rankine Cycle or the Carnot Cycle.

Thermal Hydraulic DC Generator Engines incorporate a PLC based control system that eliminates the need for governors and voltage regulators. They incorporate inverter systems to create "clean" power at unity power factor. This is a new system that has never been accomplished before.

The technological innovation regarding the Thermal Hydraulic DC Generator revolves around regulating the flow of the hydraulic fluid to the hydraulic pump and creating the correct RPM for the DC Generator. The load demands of the building electrical system are matched through the PLC based control system and instrumentation. The generator governor and regulator have been replaced by the PLC based control system. The correct flow of hydraulic fluid is supplied to the hydraulic pump. The DC output from the generator is connected to an inverter that corrects the AC output to a unity power factor. This is a new system that has never been accomplished before.

Figure 1:
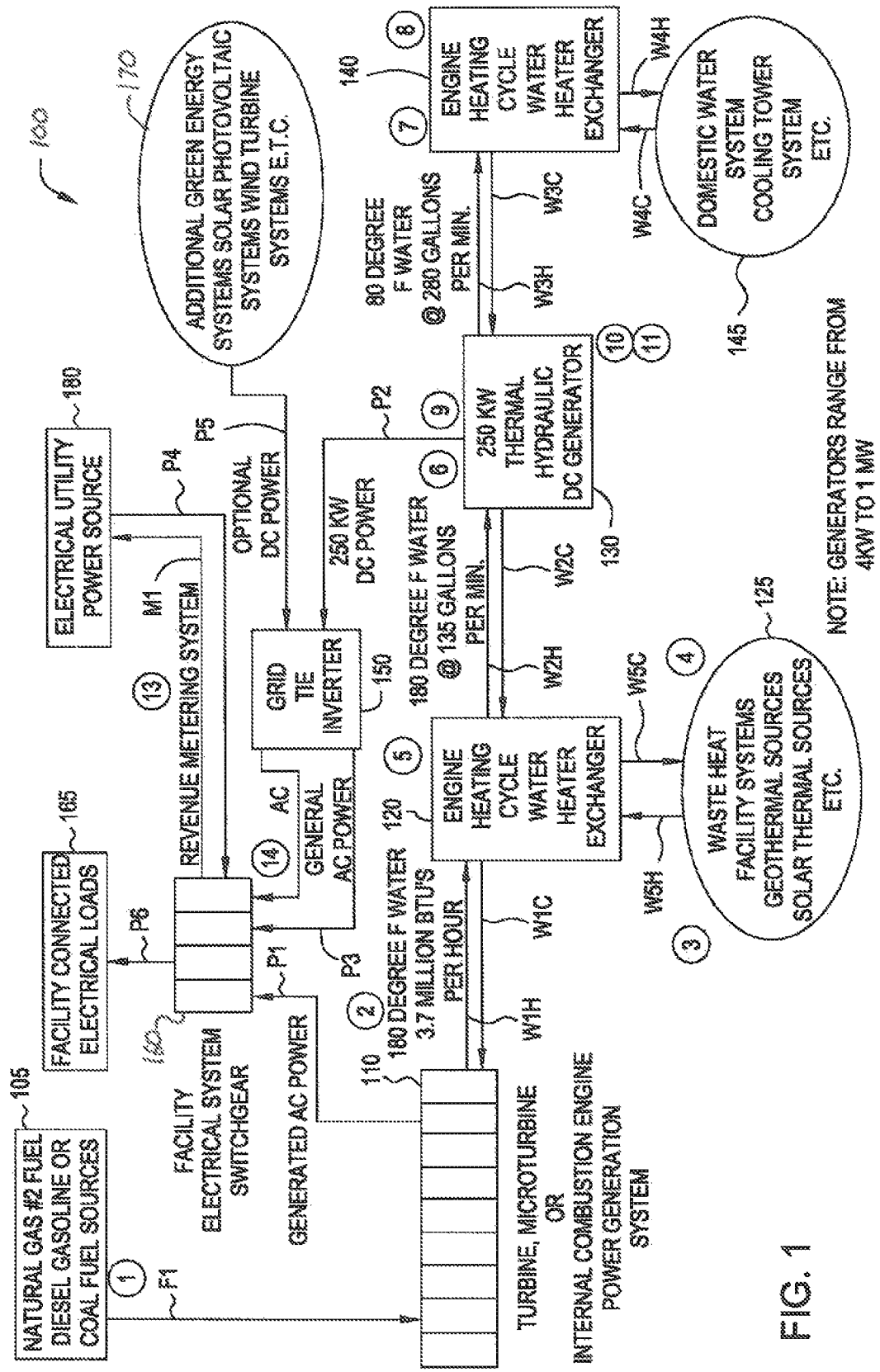
FIG. 1 depicts a high level block diagram of a system according to an embodiment.
Figure 2:
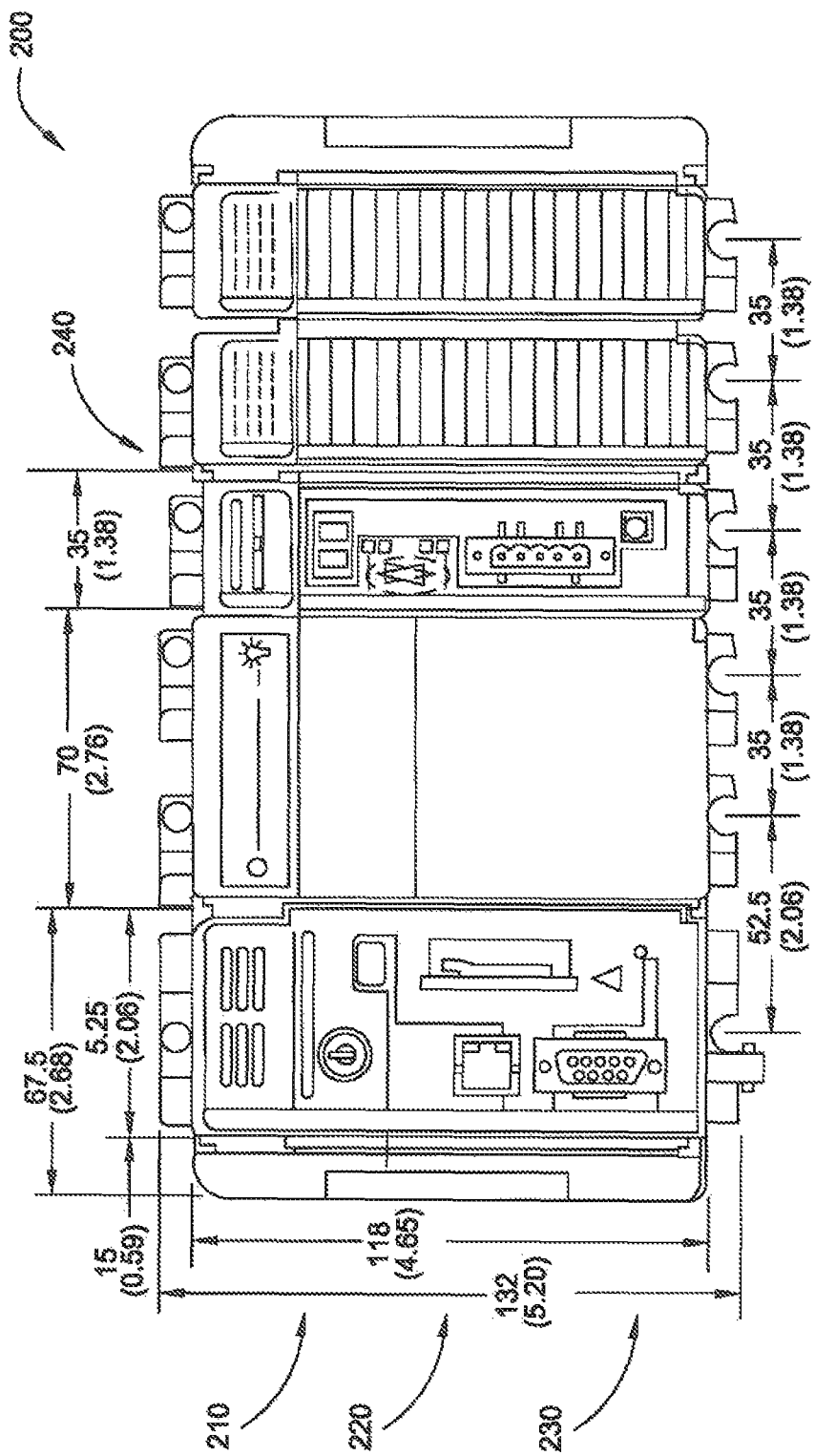
FIG. 2 graphically depicts physical dimensions of an exemplary Programmable Logic Controller (PLC) suitable for use as a controller within the system of FIG. 1.
Figure 3:
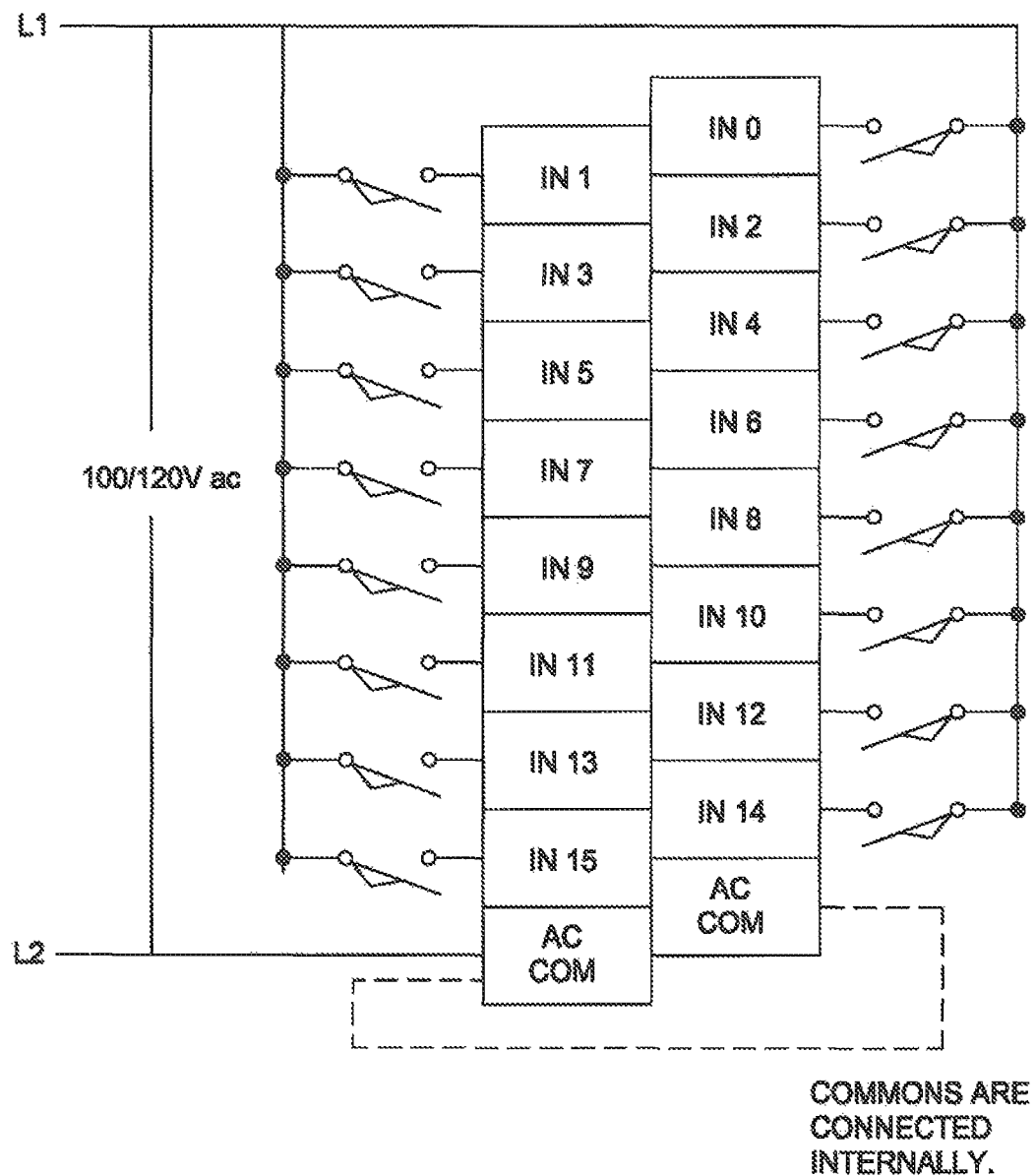
FIG. 3 graphically depicts exemplary power and signal input terminals associated with the PLC of FIG. 2.
Figure 4A:
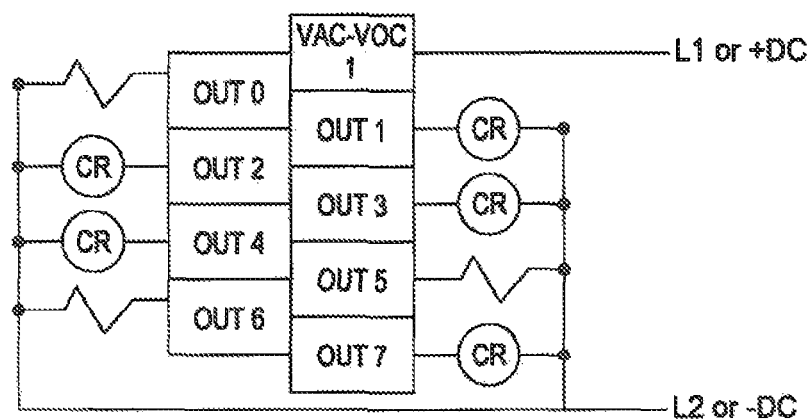
FIGS. 4A and 4B graphically depict exemplary signal output terminals associated with the PLC of FIG. 2.
Figure 4B:
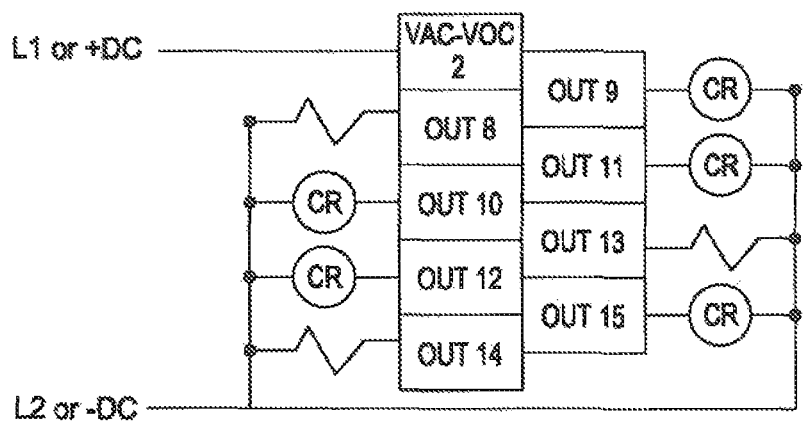
Figures 9B, 9C:
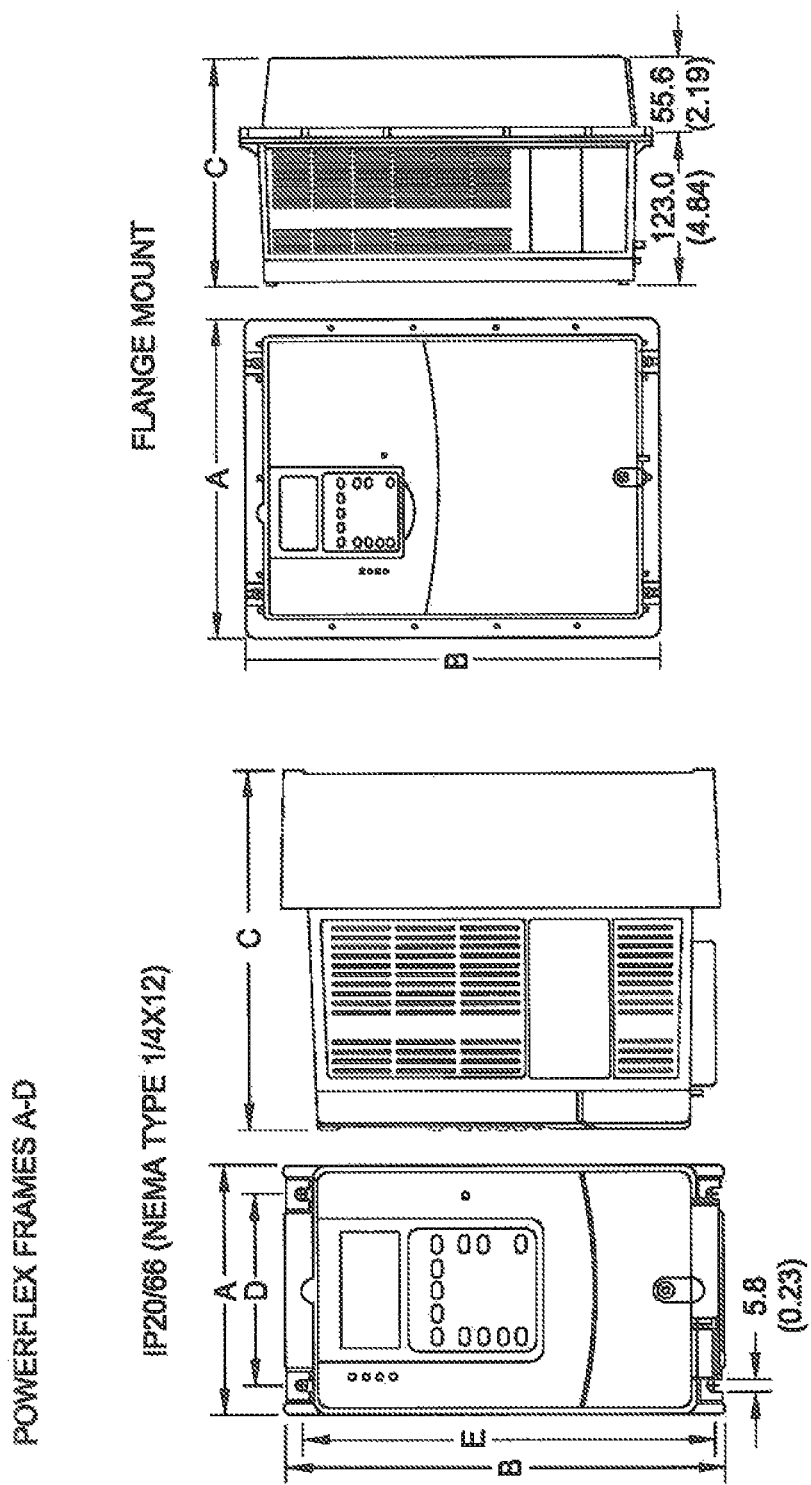
Figure 10:
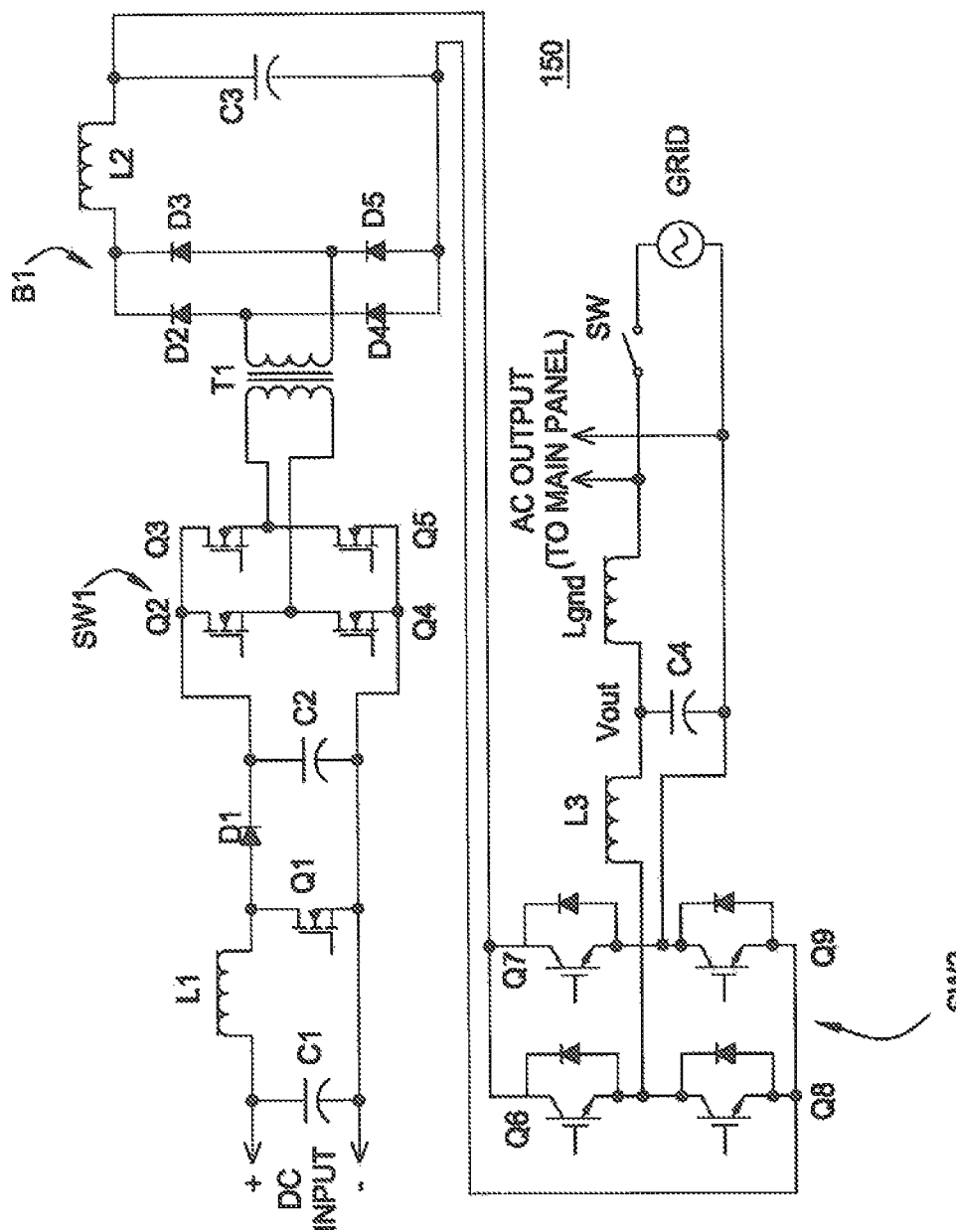
FIG. 10 depicts a schematic diagram of an exemplary inverter suitable for use as a grid tie inverter within the system of FIG. 1.
Figure 11:
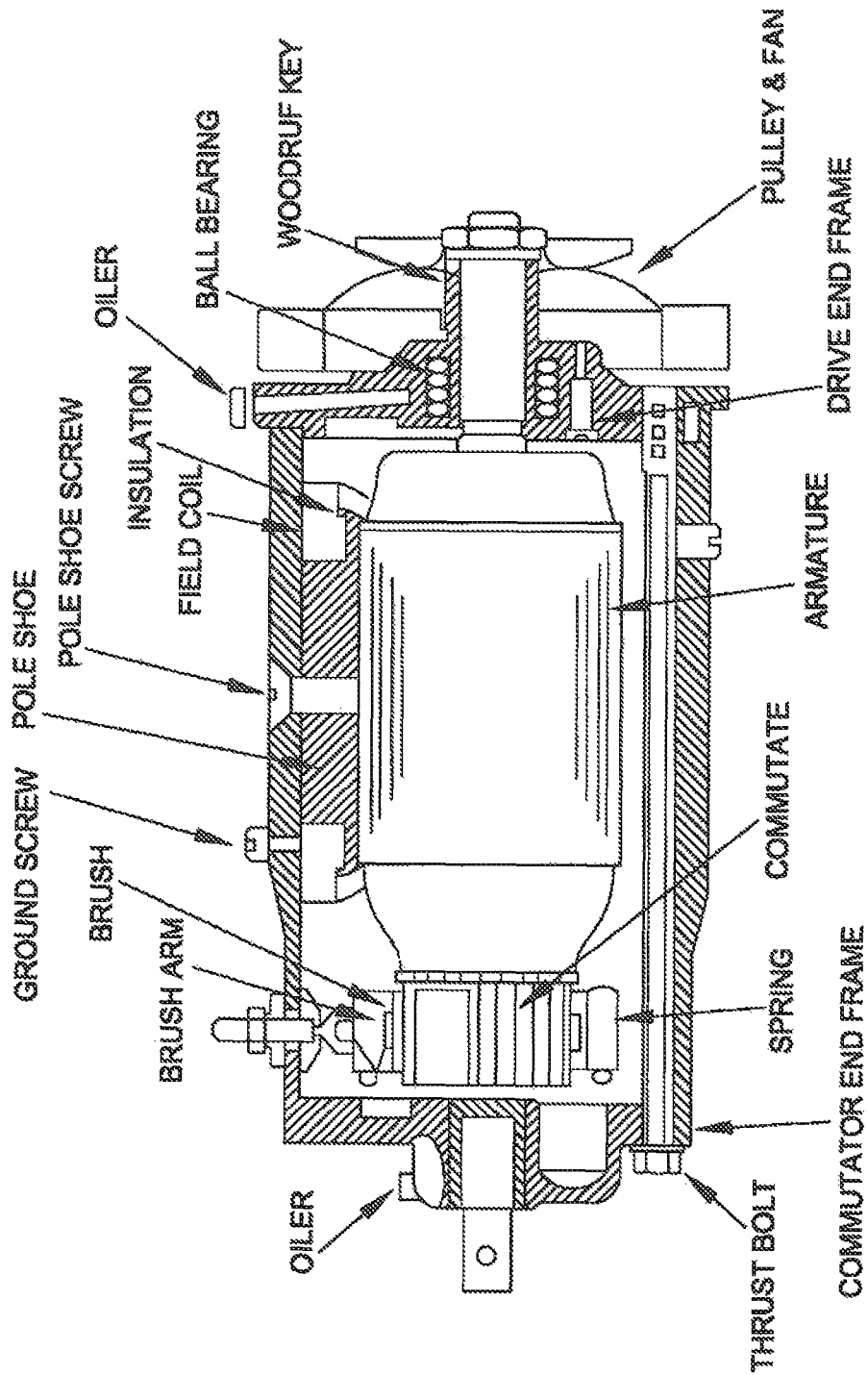
FIG. 11 graphically depicts a generator suitable for use within the system of FIG. 1.

Various embodiments are described within the context of the figures. FIG. 1 represents a flow diagram for a Thermal Hydraulic DC Generator connected to a microturbine system to capture waste heat from the exhaust and increase the efficiency of the overall system. FIG. 2 represents a 32 bit microprocessor with Ethernet communications for the PLC based control system. FIG. 3 represents a discrete input module used for the PLC based control system. FIG. 4 represents a discrete output module for the PLC based control system. FIG. 5 represents an analog input module for the PLC based control system. FIG. 6 represents an analog output module for the PLC based control system. FIG. 7 represents an RTD input module for the PLC based control system. FIG. 8 represents an operator interface terminal used for the PLC based control system. FIG. 9 represents a VFD used for circulation pump control with the PLC based control system. FIG. 10 represents a grid tie inverter that will be used to convert DC power to AC Power and synchronize with the utility power grid at unity power factor. A process description is also included. FIG. 11 represents a DC generator used to generate DC power.

FIG. 1 depicts a high level block diagram of a system according to an embodiment. Generally speaking, FIG. 1 depicts a flow diagram for a Thermal Hydraulic DC Generator connected to a microturbine system to capture waste heat from the exhaust and increase the efficiency of the overall system.

Referring to FIG. 1, a system 100 includes a fuel source 105 (e.g., natural gas, #2 fuel, diesel, gasoline, coal or other fuel source), a power generation system 110 (illustratively a turbine, micro-turbine, internal combustion engine or other power generation system), an engine heating cycle water heat exchanger 120, optional heat sources 125 (illustratively waste heat from facility systems, heat from geothermal sources, heat from solar thermal sources etc.), a thermal hydraulic DC generator 130 (illustratively a 250 kW generator, or other generator ranging from 4 kW to 1 MW), an engine cooling cycle water heat exchanger 140, cooling sources 145 (illustratively a domestic water system, a cooling tower system etc.), a grid tie inverter 150, facility electrical system switchgear 160, facility connected electrical loads 165, optional additional green energy systems 170 (illustratively solar photovoltaic systems, wind turbine systems etc.) and an electrical utility power source 180.

The power generation system 110 receives fuel from the fuel source 105 via path F1, and generates AC power which is coupled to facility electrical system switchgear 160 via path P1.

The engine heating cycle water heat exchanger 120 receives 180° F. water from the power generation system 110 via path W1H (illustratively at 3.7 million BTUs per hour), and returns cooler water to the power generation system 110 via path W1C.

The engine heating cycle water heat exchanger 120 may receive hot water from optional heat sources 125 via path W5H, and return cooler water to the optional heat sources 125 via path W5C.

The engine heating cycle water heat exchanger 120 provides hot water to the thermal hydraulic DC generator 130 via path W2H, and receives cooler water from the thermal hydraulic DC generator 130 via path W2C. In the illustrated embodiment, path W2H supplies 180° F. water at a rate of 135 gallons per minute to a 250 kW thermal hydraulic DC generator 130.

The thermal hydraulic DC generator 130 provides hot water to the engine cooling cycle water heat exchanger 140 via path W3H, and receives cooler water from the engine cooling cycle water heat exchanger 140 via path W3C. In the illustrated embodiment, path W3C supplies 80° F. water at a rate of 280 gallons per minute to a 250 kW thermal hydraulic DC generator 130.

The engine cooling cycle water heat exchanger 140 provides hot water to cooling sources 145 via path W4H, and receives cooler water from the cooling sources 145 via path W4C.

The thermal hydraulic DC generator 130 generates DC power in response to the temperature differential between the 180° F. water provided via the W2H/W2C fluid loop and the 80° F. water provided via the W3H/W3C fluid loop. The DC power, illustratively 250 kW AC power, is provided to grid tie inverter 150 via path P2.

Grid tie inverter 150 may also receive additional DC power via path P5 from optional additional green energy systems 170.

Grid tie inverter 150 operates to invert received DC power to thereby generate AC power which is coupled to facility electrical system switchgear 160. Grid tie inverter 150 "ties" DC power to the electrical grid by inverting the DC power such that the resulting generated AC power conforms to power grid specifications.

Facility electrical system switchgear 160 receives AC power from electrical utility power source 180 via path P4, and provides revenue metering system information to electrical utility power source 180 via M1.

Facility electrical system switchgear 160 operates to supply AC power to facility connected electrical loads 165, the supplied AC power comprising power from one or more of power generation system 110, grid tie inverter 150 and electrical utility power source 180.

An operating methodology associated with the system 100 of FIG. 1 will now be described with respect to the below steps, each of which is indicated in FIG. 1 by a corresponding circled number.

Step 1. Natural Gas, Methane, #2 Fuel Oil, or Diesel Fuel can be used to power Turbine Generators or Combustion Engine Generators that produce electricity and synchronize with the utility electrical system by the use of an inverter at unity power factor.

Step 2. The exhaust from the Turbine Generators or Combustion Engine Generators Heat circulated water through manifolds or engine water jackets.

Step 3. Additional energy is recovered from the Turbine Generators or Combustion Engine Generators exhaust systems through the use of an air over water secondary heat exchanger that is incorporated with the same hot water closed loop system as the manifolds or the water jackets.

Step 4. Additional energy can be recovered from other building systems through the use of a water/steam over water secondary heat exchanger, Geothermal Sources, or Solar Collectors that are incorporated with the same hot water closed loop system as the Turbine Generators or Combustion Engine manifolds or water jackets.

Step 5. The temperature of the hot water closed loop system is regulated at 180 degrees F. by the use of variable frequency drive (VFD) controlled circulating pumps. The temperature is a function of the water flow in the system. The flow of the water is regulated by the rpm of the circulating pumps. The VFD's are controlled by a PLC based control system. PID loops in the PLC program monitor and control the temperature, pressure, and flow of the hot water loop. These PID loops control the VFD output and the rpm of the circulating pumps. The heating water that returns from the Thermal Hydraulic DC Generator Engine is at approximately 150 degrees F.

Step 6. The 180-degree F. water is circulated through a Thermal Hydraulic DC Generator Engine. The water is used to expand liquid carbon dioxide which in turn drives a piston in one direction. A solenoid valve that is controlled by the PLC based control system controls the water flow. The liquid carbon dioxide does not experience a phase change. The Thermal Hydraulic DC Generator Engine does not involve an intake and exhaust cycle. It is very efficient and has a very long life expectancy with minimal maintenance requirements.

Step 7. An 80-degree F. cooling-water closed loop system is also required to operate the Thermal Hydraulic DC Generator Engine. This cooling-water loop is circulated through a sanitary water over water heat exchanger that is installed in the domestic water system or through a water over water heat exchanger that is connected to a cooling tower or a cooling water piping system in the ground. The domestic water temperature is usually around 70-80 Degrees F. The cooling water that returns from the Thermal Hydraulic DC Generator Engine is at approximately 100 degrees F.

Step 8. The temperature of the cooling water closed loop system is regulated by the use of variable frequency drive controlled circulating pumps. The temperature is a function of the water flow in the system. The flow of the water is regulated by the rpm of the circulating pumps. The VFD's are controlled by a PLC based control system. PID loops in the PLC program monitor and control the temperature, pressure, and flow of the hot water loop. These PID loops control the VFD output and the rpm of the circulating pumps. The heating water that returns from the Thermal Hydraulic DC Generator Engine is at approximately 170 degrees F.

Step 9. The 80-degree F. water is circulated through a Thermal Hydraulic DC Generator Engine. The water is used to contract liquid carbon dioxide, which in turn drives a piston in the opposite direction from expanded liquid carbon dioxide. A solenoid valve that is controlled by a PLC based control system controls the water flow.

Step 10. The Thermal Hydraulic DC Generator Engine drives a hydraulic pump. The pistons moving back and forth pump hydraulic fluid. The flow of the hydraulic fluid is regulated by PID loops in the PLC based control system. The PLC program coordinates the opening and closing of the solenoid valves for the heating and cooling water loops with the required flow rate of the hydraulic fluid.

Step 11. The hydraulic pump drives a DC generator. The DC generator is connected to a grid tie inverter which synchronizes with the building electrical system at unity power factor. This device is referred to as a "Thermal Hydraulic DC Generator."

Step 12. Additional "Green Energy" systems can be connected to the same grid tie inverter in order to synchronize with the building electrical system. These systems can include solar photovoltaic modules and wind Turbine systems.

Step 13. Revenue metering is established to monitor the power sold to the utility when the total generation exceeds the demand for the building systems.

Step 14. In cases where revenue metering is not allowed by the utility, the number of Micro Turbines that are synchronized to the building electrical system can be controlled by the PLC based control system. In this case the demand for the building will have to exceed the total amount of power that is generated.

In various embodiments, the PLC based control system performs the following functions:
1. Regulate the temperatures, pressures and flow rates for the heating cycle and cooling cycle water system.
2. Regulate the temperatures, pressures and flow rates for the hydraulic systems.
3. Control the firing rate of the solenoid valves to regulate the engine speed.
4. Control the inverter output.
5. Control associated generation systems.
6. Monitor the electrical system load demand.
7. Communicate with multifunction relays associated with the utility service.
8. Data Collection System
9. Alarm system In various embodiments, the PLC based control system utilizes the following devices:
1. 32 bit microprocessor
2. Analog Input Module
3. Analog Output Module
4. Discrete Input Module
5. Discrete Output Module
6. RTD Temperature Sensors
7. Differential Pressure Transmitters
8. Flow Meters
9. Variable Frequency Drives
10. Multifunction Protective Relays
11. Current Sensors
12. Voltage sensors
13. Frequency Sensors
14. Operator Interface Terminal
15. Data Collection System
16. Alarm System FIG. 2 graphically depicts physical dimensions of an exemplary Programmable Logic Controller (PLC) suitable for use as a controller within the system of FIG. 1. In various embodiments, the PLC comprises a 32 bit microprocessor-based PLC with Ethernet communications, such as the model 1769-L32C or 1769-L35CR CompactLogix Controller manufactured by Rockwell Automation. It can be seen by inspection that the exemplary PLC 200 of FIG. 2 includes various connection an interface elements such as central processing unit (CPU) connectors 210, control network connectors 220, channel input/output connectors 230, user or operator input/output interface devices 240 and the like. Generally speaking and as known in the art, the PLC 200 of FIG. 2 comprises a device including a processor, memory and input/output circuitry which may be programmed to monitor various digital and/or analog input signals and responsively adapts various output signal levels or data/communication sequences in response to such monitoring.

FIG. 3 graphically depicts exemplary power and signal input terminals associated with the PLC of FIG. 2. Specifically, FIG. 3 represents a discrete input module used for the PLC based control system. It can be seen by inspection that the power terminals are responsive to a line or grid voltage of 100/120 VAC (in this embodiment) and that various input devices may be coupled to the signal input terminals.

FIG. 4 graphically depicts exemplary signal output terminals associated with the PLC of FIG. 2. Specifically, FIG. 4 represents a discrete output module for the PLC based control system comprising, illustratively, a 16-point AC/DC Relay Output Module. It can be seen by inspection that the relay output module is adapted to be grounded in a particular manner.

Figure 5A:
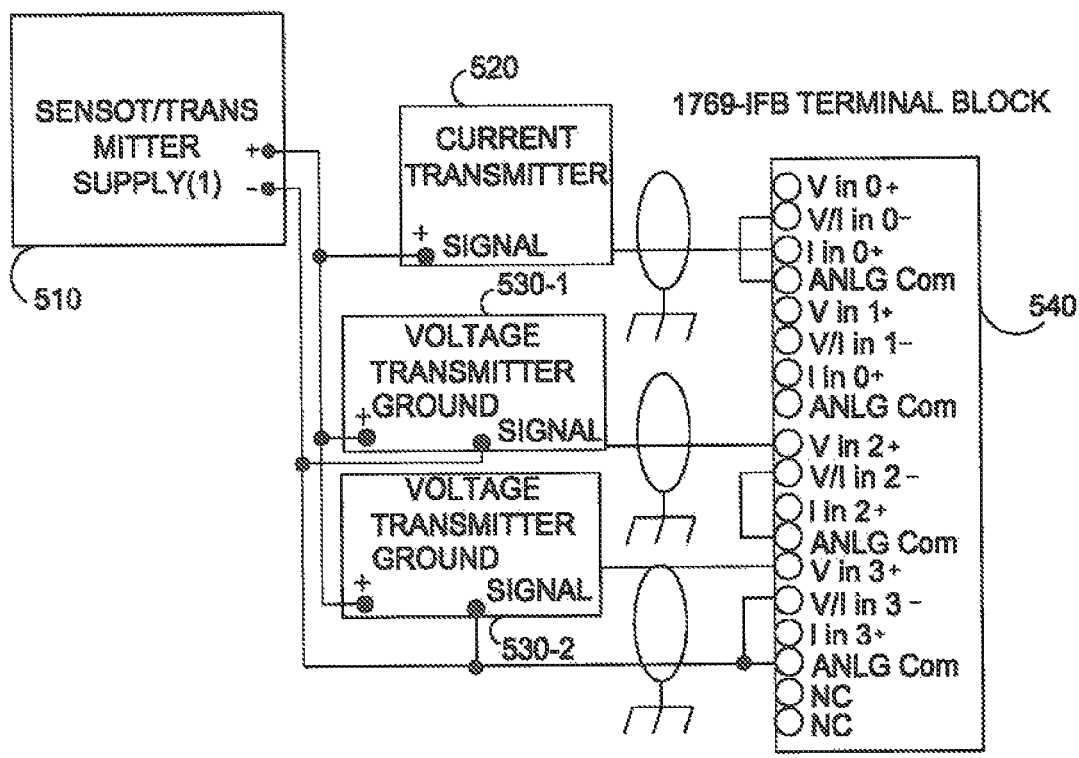
FIGS. 5A and 5B graphically depict an exemplary wiring configuration for connecting sensors/transmitters to signal input terminals associated with the PLC of FIG. 2.
Figure 5B:
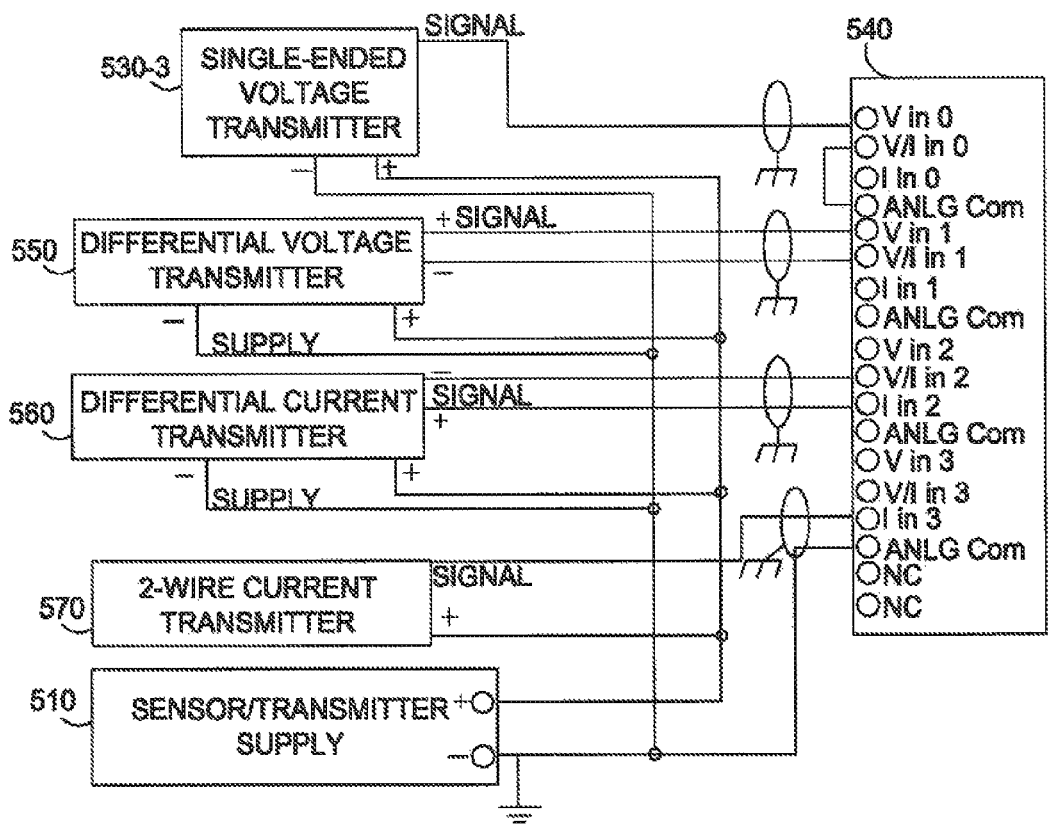
Figure 6:
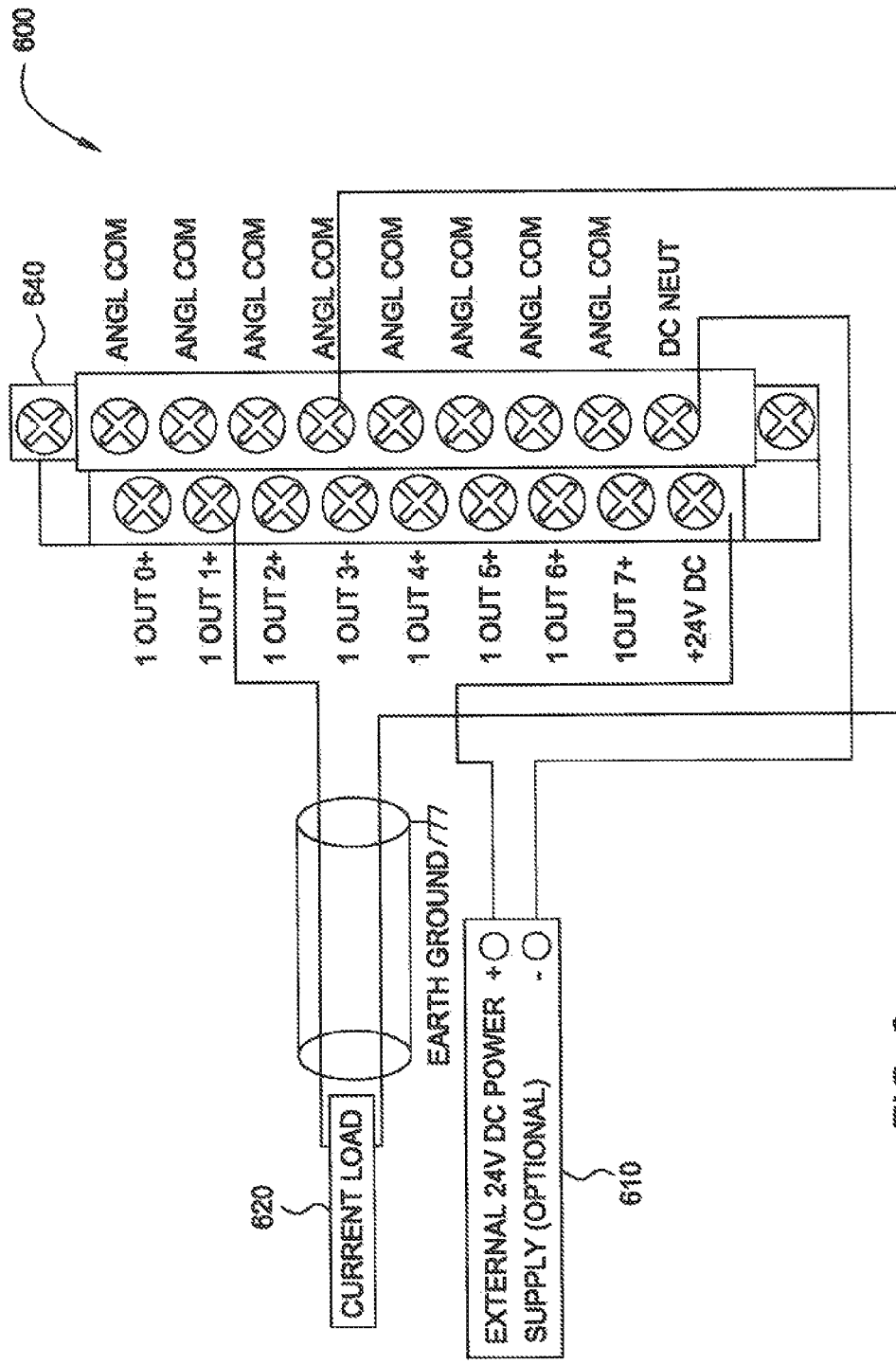
FIG. 6 graphically depicts an exemplary wiring configuration for connecting an output device to signal output terminals associated with the PLC of FIG. 2.

FIG. 5 graphically depicts an exemplary wiring configuration for connecting sensors/transmitters to signal input terminals associated with the PLC of FIG. 2. Specifically, FIG. 5 represents an analog input module for the PLC based control system. FIG. 5 is divided into two sub-figures; namely, FIG. 5A and FIG. 5B.

FIG. 5A graphically depicts an exemplary wiring configuration for connecting single-ended sensor/transmitter types to signal input terminals associated with the PLC of FIG. 2. It can be seen by inspection that a sensor/transmitter power supply 510 cooperates with a current sensor/transmitter 520 and a plurality of voltage sensor/transmitters 530. The current sensor/transmitter 520 provides an output signal adapted in response to a sensed parameter, which output signal is provided to a current sensor input terminal (I in 0+) of a terminal block 540. The voltage sensor/transmitters 530 provide output signals adapted in response to respective sensed parameters, which output signals are provided to respective voltage sensor input terminals (V in 2+ and V in 3+) of the terminal block 540.

FIG. 5B graphically depicts an exemplary wiring configuration for connecting mixed transmitter types to signal input terminals associated with the PLC of FIG. 2. It can be seen by inspection that a sensor/transmitter power supply 510 cooperates with a single ended voltage sensor/transmitter 530, a differential voltage sensor/transmitter 550, a differential current sensor/transmitter 560 and a 2-wire current sensor/transmitter 570. Each of the sensor/transmitter types 530, 550, 560 and 570 provides an output signal adapted in response to a respective sensed parameter, which output signal is provided to a respective input terminal of a terminal block 540.

FIG. 6 graphically depicts an exemplary wiring configuration for connecting an output device to signal output terminals associated with the PLC of FIG. 2. Specifically, FIG. 6 represents an analog output module for the PLC based control system. It can be seen by inspection that an optional external 24 V DC power supply is connected between an DC neutral terminal and a +24 VDC terminal of a terminal block 640, while a shielded cable 620 provides current to a load (not shown) load, the current sourced from a current output terminal (I out 1+) of the terminal block 640.

Figure 7A:
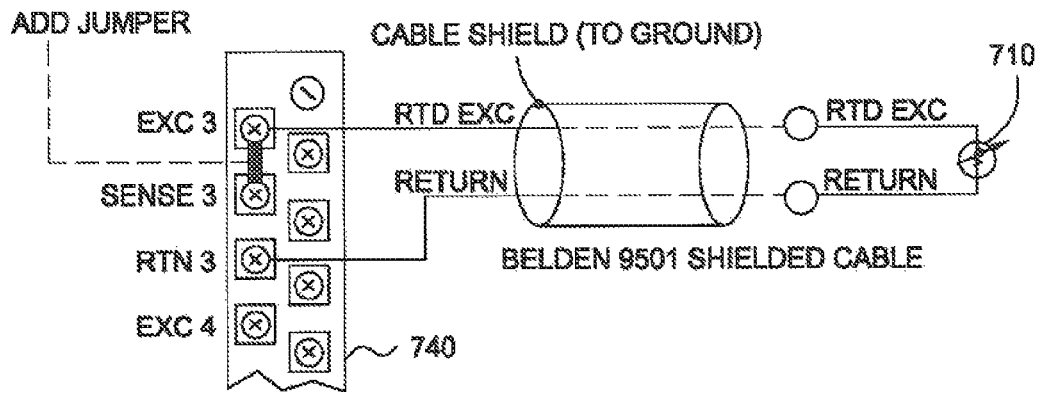
FIGS. 7A and 7B graphically depict an exemplary wiring configuration for connecting a Resistance Temperature Detector (RTD) to excitation and sense input terminals of the PLC of FIG. 2.
Figure 7B:
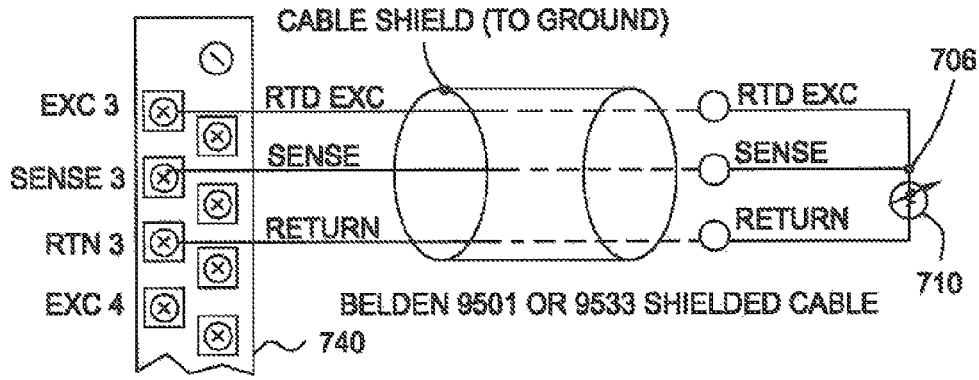

FIG. 7 graphically depicts an exemplary wiring configuration for connecting a Resistance Temperature Detector (RTD) to excitation and sense input terminals of the PLC of FIG. 2. Specifically, FIG. 7 represents an RTD input module for the PLC based control system. FIG. 7 is divided into two sub-figures; namely, FIG. 7A and FIG. 7B.

FIG. 7A graphically depicts an exemplary wiring configuration for connecting a 2-wire Resistance Temperature Detector (RTD) to excitation and sense input terminals of the PLC of FIG. 2. It can be seen by inspection that an RTD 710 is coupled between bridged excitation (EXC 3) and sense (SENSE 3) terminals at a terminal block 740, and a return terminal (RTN 3) at the terminal block 740. Current sourced from the excitation/sensor terminals passes through the RTD 710 and returns to the return terminal. It is also noted that a two-conductor shielded cable, illustratively a Belden 9501 Shielded Cable, is used to connect the excitation/sense wire (RTD EXC) and return wire (Return) between the RTD 710 and terminal block 740. The shield of the shielded cable is coupled to ground.

FIG. 7B graphically depicts an exemplary wiring configuration for connecting a 3-wire Resistance Temperature Detector (RTD) to excitation (EXC 3), sense (SENSE 3) and return (Return) terminals at a terminal block 740 of the PLC of FIG. 2. It can be seen by inspection that an RTD 710 is coupled between a junction or connection 0.706 proximate the RTD 710 of an excitation signal wire (RTD EXC) and a sense signal wire (Sense), and a return signal wire (Return). It is also noted that a three-conductor shielded cable, illustratively a Belden 83503 or 9533 Shielded Cable, is used to connect the excitation wire (RTD EXC), sense wire (sense That) and return wire (Return) between the RTD 710 and terminal block 740. The shield of the shielded cable is coupled to ground.

Figure 8A:
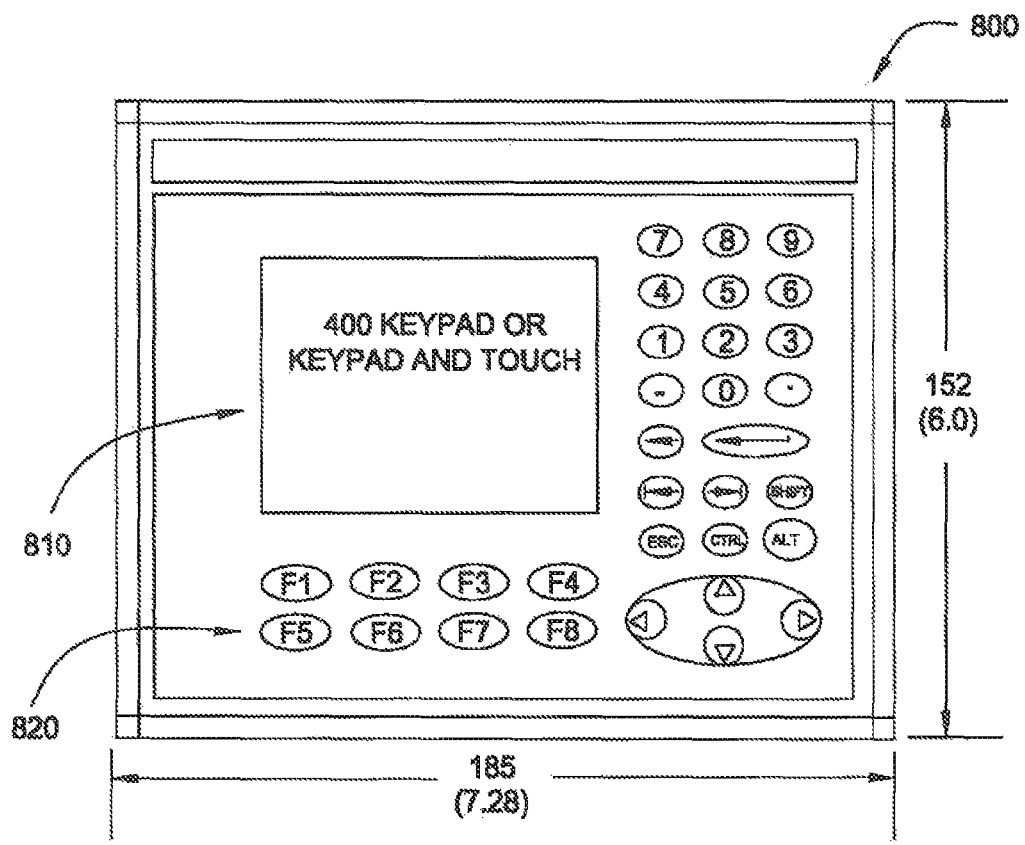
FIGS. 8A and 8B graphically depict physical dimensions of an exemplary user interface device associated with the PLC of FIG. 2.
Figure 8B:
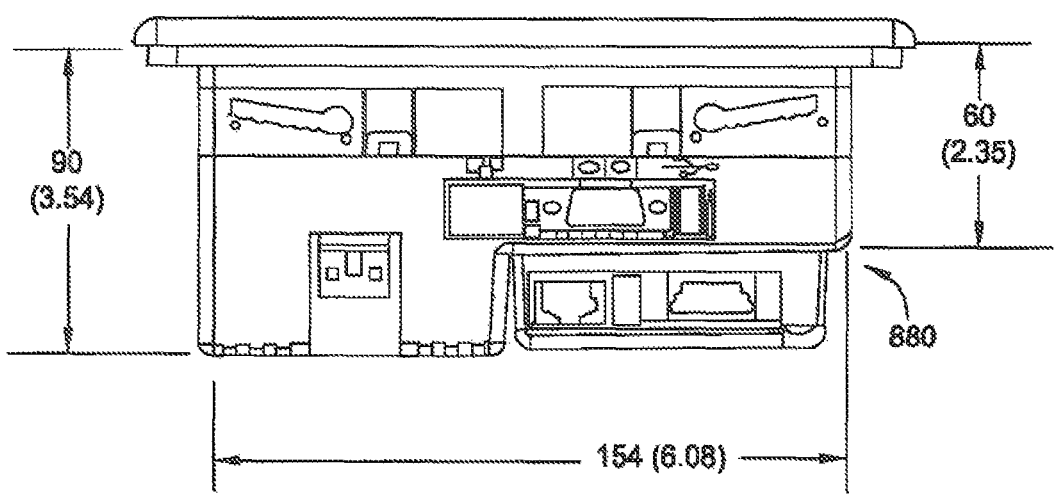

FIG. 8 graphically depicts physical dimensions of an exemplary user interface device associated with the PLC of FIG. 2. Specifically, FIG. 8 represents an operator interface terminal 800 used for the PLC based control system. FIG. 8A depicts a front view of the operator interface terminal 800, while FIG. 8B depicts a plan view of the operator interface terminal 800. It can be seen by inspection that the exemplary operator interface terminal 800 comprises a PanelView Plus 400 or 600 terminal manufactured by Allen-Bradley. The terminal 800 includes a keypad or keypad/touch screen 810/820. Generally speaking, the terminal includes circuitry supporting user input to the PLC (e.g., keypad or touch screen input), as well as circuitry providing user output from the PLC (e.g., display screen). As is known in the art, the terminal 800 is used to facilitate programming of the various functions of the PLC 200, such as those described herein as implemented via the PLC 200 and the various embodiments. It is also noted that the terminal includes various network and communication ports 830 as shown in FIG. 9 graphically depicts physical dimensions for various VFDs suitable for providing circulation pump control functionality in the system of FIG. 1 in cooperation with the PLC of FIG. 2. FIG. 9 represents a VFD used for circulation pump control with the PLC based control system, illustratively one of the PowerFlex 70 frames manufactured by Rockwell Automation. FIG. 9A depicts a table listing output power for various PowerFlex 70 frame sizes. FIGS. 9B and 9C depict physical dimensions associated with PowerFlex 70 Frames A-D as indicated in the table of FIG. 9A. FIG. 9C depicts a table listing physical mounting options associated with various PowerFlex 70 frame sizes.

FIG. 10 depicts a schematic diagram of an exemplary inverter suitable for use as a grid tie inverter within the system of FIG. 1. Specifically, FIG. 10 represents a grid tie inverter. The grid tie inverter 150 of FIG. 10 is used to convert DC power to AC Power and synchronize the AC power with the utility power grid at unity power factor. Referring to FIG. 10, components associated with grid tie inverter 150 are configured as follows:

A DC input voltage is received across an input capacitor C1. A first inductor L1 and a first transistor Q1 (illustratively an N-channel IGFET) are connected in series in the order named between positive and negative terminals of the input capacitor C1.

A forward biased diode D1 and second capacitor C2 are connected in series in the order named between a source and a drain of transistor Q1 (i.e., anode of diode D1 connected to source of transistor Q1, cathode of diode D1 connected to positive terminal of capacitor C2).

A first switching circuit SW1 connected between positive and negative terminals of capacitor C2 operates to switch or chop the voltage across capacitor C2. The switching circuit SW1 comprises, illustratively, four transistors Q2-Q5 (illustratively an N-channel IGFETs) configured in a known manner to drive a switched power signal through a input coil of a transformer T1.

An output coil of transformer T1 provides a resulting switched or chopped signal to a full wave bridge rectifier B1 formed in a known manner using four diodes D2-D5 to provide thereby a rectified (i.e., substantially DC) signal.

A second inductor L2 and a third capacitor C3 are connected in series in the order named between positive and negative outputs of the full wave bridge rectifier B1.

A second switching circuit SW2 connected between positive and negative terminals of capacitor C3 operates to switch or chop the voltage across capacitor C3. The switching circuit SW1 comprises, illustratively, four transistors to 6-29 (illustratively an NPN transistors having respective diodes forward biased between emitter and collector terminals.) configured in a known manner to a series drive a switched power signal through a third inductor L3 and a fourth capacitor C4, L3 and C4 being connected in series in the order named.

An inductive element Lgrid (representative of power grid inductance), a switch SW and the power grid itself are connected in series in the order named between positive and negative terminals of capacitor C4.

An AC output signal between the Lgrid/SW junction point and the negative terminal capacitor C4 is provided as an AC output to the main panel.

Referring to FIGS. 1 and 10, various operations of the grid tie inverter 150 within the context of the system 100 will now be described.

Operating a renewable energy system in parallel with an electric grid requires special grid interactive or grid tie inverters (GTI). The power processing circuits of a GTI are similar to that of a conventional portable power inverter. The main differences are in their control algorithm and safety features.

Figure 12:
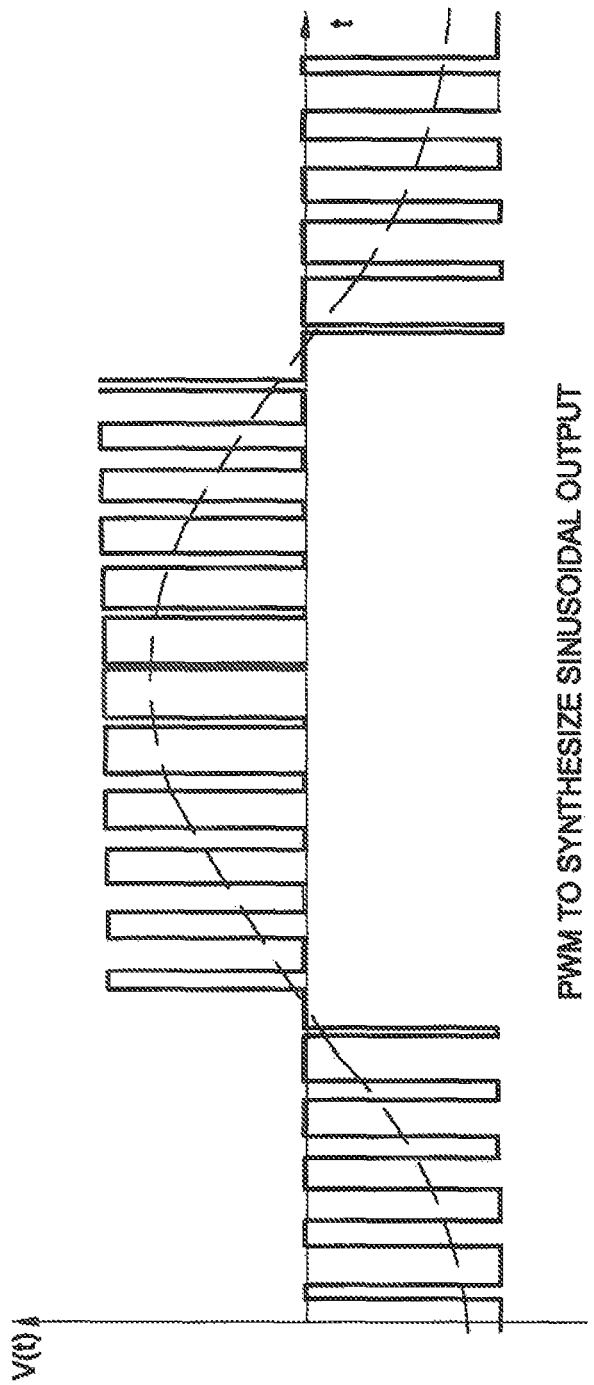
FIG. 12 graphically depicts PWM synthesis of a sinusoidal waveform.

A GTI typically takes the DC voltage from the source, such as an solar panels array or a wind system, and inverts it to AC. It can provide power to your loads and feed an excess of the electricity into the grid. The GTIs are normally two-stage or three-stage circuits. The simplified schematic diagram shown in FIG. 12 illustrates the PWM to sinusoidal waveshape operation of a grid tie inverter with three power stages. Such power train can be used for low-voltage inputs (such as 12V). The control circuits and various details are not shown here.

The DC input voltage is first stepped up by the boost converter formed with inductor L1, MOSFET Q1, diode D1 and capacitor C2. If PV array is rated for more than 50V, one of the input DC busses (usually the negative bus) has to be grounded per National Electric Code®.

Since the AC output is connected to the grid, in such case the inverter has to provide a galvanic isolation between the input and output. In our example the isolation is provided by a high frequency transformer in the second conversion stage. This stage is a basically a pulse-width modulated DC-DC converter. Note that some commercial models use low-frequency output transformer instead of a high frequency one. With such method low voltage DC is converted to 60 Hz AC, and then a low-frequency transformer changes it to the required level. The schematic above shows a full bridge (also known as H-bridge) converter in the second stage. For power levels under 1000 W it could also use a half-bridge or a forward converter. In Europe, grounding on DC side is not required, the inverters can be transformerless. This results in lower weight and cost.

The transformer T1 can be a so-called step-up type to amplify the input voltage. With a step-up transformer, the first stage (boost converter) may be omitted. The isolating converter provides a DC-link voltage to the output AC inverter. Its value must be higher than the peak of the utility AC voltage. For example, for 120 VAC service, the DC-link should be >120*√2=168V. Typical numbers are 180-200V. For 240 VAC you would need 350-400 V.

The third conversion stage turns DC into AC by using another full bridge converter. It consists of IGBT Q6-Q9 and LC-filter L3, C4. The IGBTs Q6-Q9 work as electronic switches that operate in Pulse Width Modulation (PWM) mode. They usually contain internal ultrafast diodes. By controlling different switches in the H-bridge, a positive, negative, or zero voltage can be applied across inductor L3. The output LC filter reduces high frequency harmonics to produce a sine wave voltage.

A grid tie power source (i.e., grid tie inverter 150) operates to synchronize its frequency, phase and amplitude with the utility and feed a sine wave current into the load. Note that if inverter output voltage (Vout) is higher than utility voltage, the GTI will be overloaded. If it is lower, GTI would sink current rather than source it. In order to allow the electricity flow back into the grid, "Vout" has to be just slightly higher than the utility AC voltage. Usually there is an additional inductor (Lgrid) between GTI output the grid that "absorbs" extra voltage. It also reduces the current harmonics generated by the PWM. A drawback of "Lgrid" is it introduces extra poles in the control loop, which may lead to the system instability.

In solar applications, to maximize the system efficiency, a GTI has to meet certain requirements defined by the photovoltaic panels. Solar panels provide different power in different points of their volt-ampere (V-I) characteristic. The point in the V-I curve where output power is maximum is called maximum power point (MPP). The solar inverter must assure that the PV modules are operated near their MPP. This is accomplished with a special control circuit in the first conversion stage called MPP tracker (MPPT).

A GTI also has to provide so-called anti-islanding protection. When grid fails or when utility voltage level or frequency goes outside of acceptable limits, the automatic switch SW quickly disconnects "Vout" from the line. The clearing time must be less than 2 seconds as required by UL 1741.

The implementation of control algorithm of grid tie inverters is quite complex implemented with microcontrollers.

FIG. 11 graphically depicts a generator suitable for use within the system of FIG. 1. Specifically, FIG. 11 represents a DC generator used to generate DC power.

Various embodiments provide a novel Thermal Hydraulic DC Generator. The inventor notes that a person in the relevant technical field would think that it would not be possible to use this combination of devices for the following reasons:

People in this field would not realize that the regulation of the hydraulic fluid in the Thermal Hydraulic DC Generator Engine to drive the Thermal Hydraulic DC Generator RPM at the correct speed could be achieved. This will eliminate the need for a regulator and a an engine speed governor that is typically required for an engine/generator package. This will require a PLC based control system with the correct instrumentation devices.

People in this field would not realize that the regulation of the DC Generator and the output of the inverter to match the load demands could be achieved. This will require a PLC based control system with the correct instrumentation devices.

People in this field would not realize that the regulation of pressures, temperatures, and flow rates for the closed loop hot water and cooling water systems could be achieved in a steady manner. This will require a PLC based control system with the correct instrumentation devices.

People in this field would not realize that it is economically feasible to implement this system. The efficiency of the Thermal Hydraulic DC Generator is much better than anything else available for this type of application. This is new technology and people in the field are not aware of its capabilities.

People in this field would not realize that so much energy is wasted in turbine generator exhaust systems. They would not realize that so much energy can be recovered and used to generate additional electricity with a Thermal Hydraulic DC Generator at such a low cost. Again, this is new technology, and people in the field are not aware of its capabilities.

People in this field would not realize that the Thermal Hydraulic DC Generator system meets "Green Energy" requirements. "Green Energy" qualifies for tax credits and can add to the savings when this type of system is installed. Again, this is new technology, and people in the field are not aware of its capabilities.

People in this field would not realize that so much energy can be wasted from utility steam systems that enter large buildings in lots of cities around the world. They would not realize that so much energy can be recovered and used to generate additional electricity with a Thermal Hydraulic DC Generator at such a low cost. Again this is new technology, and people in the field are not aware of its capabilities.

People in this field would not realize that this system is very flexible and can incorporate other forms of Green Energy sources through the use of a common inverter.

People in this field would not realize that the use of the DC Generator and the inverter to generate electricity at unity power factor can increase the efficiency of the system.

In various embodiments, waste energy is recovered from Turbine Generator or Combustion Engine Generator Exhaust Systems to produce hot water for co-generation to drive Thermal Hydraulic DC Generators.

In various embodiments, waste steam is recovered from utility systems to drive Thermal Hydraulic DC.

In various embodiments, energy from Combustion Engine Cooling Water Systems is recovered to produce hot water to drive Thermal Hydraulic DC Generators.

In various embodiments, the use of Solar Collectors is incorporated in conjunction with Thermal Hydraulic DC Generators. The Solar Collectors produce hot water to drive the Thermal Hydraulic DC Generators.

Various embodiments incorporate the use of Geothermal Sources in conjunction with Thermal Hydraulic DC Generators. The Geothermal Sources produce hot water to drive the thermal Hydraulic DC Generators.

Generally speaking, the various embodiments are described above within the context of systems, methods, apparatus and so on using Thermal Hydraulic DC Generators. However, various other embodiments are contemplated in which the Thermal Hydraulic DC Generator is replaced by (or augmented by) one or both of a Thermal Hydraulic Induction Generator or a Thermal Hydraulic Synchronous Generator. Other types of thermal hydraulic generators may also be used in various embodiments.

Some types of thermal hydraulic generators provide a DC output signal, such as the Thermal Hydraulic DC Generator 130 described above with respect to FIG. 1. Other types of thermal hydraulic generators provide an AC output signal, such as Thermal Hydraulic Induction Generators and Thermal Hydraulic Synchronous Generators.

Within the context of thermal hydraulic generators providing a DC output signal, a DC to AC conversion is provided such that power generated by the thermal hydraulic generator may be used by, for example, the facility electrical system switchgear 160, facility connected electrical loads 165 and/or electrical utility power source 180 as described above with respect to FIG. 1.

In the embodiments described above with respect to FIG. 1, DC to AC conversion of the output of thermal hydraulic DC generator 130 is provided via grid tie inverter 150.

Within the context of thermal hydraulic generators providing an AC output signal, an AC to DC to AC conversion may be provided to ensure that power generated by the thermal hydraulic generator may be used. For example, depending upon the type of AC-output thermal hydraulic generator used, changes to voltage level, phase, frequency, and so on associated with the AC power signal provided by the thermal hydraulic generator may be appropriate such as to enable synchronization with AC power received from the local electrical grid (e.g., electrical utility power source 180). In embodiments where the above-described thermal hydraulic DC generator (e.g., thermal hydraulic DC generator 130) is replaced by a thermal hydraulic induction generator or a thermal hydraulic synchronous generator, the DC to AC converter (e.g., grid tie inverter 150) is not used to process the output of the thermal hydraulic generator. Instead, an AC to DC to AC converter (if necessary) to ensure that the power output signal provided by the thermal hydraulic induction generator or thermal hydraulic synchronous generator is appropriately conditioned for use by, illustratively, facility electrical system switchgear 160, facility connected electrical loads 165 and/or electrical utility power source 180. Preferably, the AC to DC to AC converter operates at a unity power factor.

Figure 13:
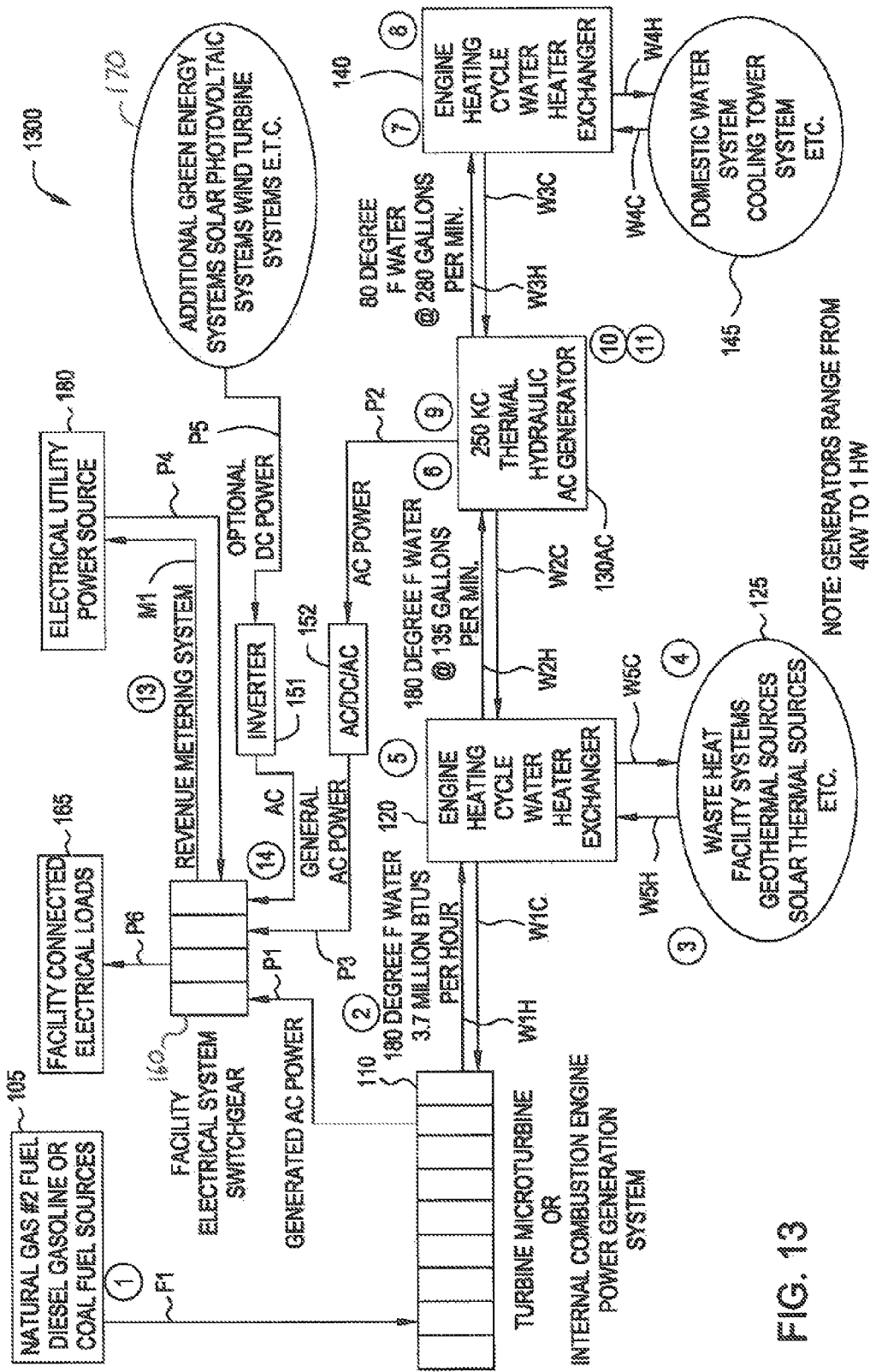
FIG. 13 depicts a high level block diagram of a system according to an embodiment.

FIG. 13 depicts a high level block diagram of a system according to an embodiment. Generally speaking, FIG. 13 depicts a flow diagram for a Thermal Hydraulic AC Generator connected to a microturbine system to capture waste heat from the exhaust and increase the efficiency of the overall system. Since the system 1300 of FIG. 13 is substantially similar to the system 100 described above with respect to FIG. 1, only the various differences between the two systems will be described in detail.

A primary difference is that the system 1300 of FIG. 13 is adapted to use a thermal hydraulic AC generator 130AC rather than a thermal hydraulic DC generator 130 of FIG. 1. In addition, the system 1300 uses as a power conditioner an AC to DC to AC converter 152 (if necessary), rather than the grid tie inverter 150, to synchronize the AC power of the with the thermal hydraulic AC generator 130AC with the utility power grid at unity power factor In various embodiments, such as where additional green energy systems 170 are used to provide optional DC power, an inverter 151 is used within the system 1300 of FIG. 13 to provide additional AC power to the facility electrical system switchgear 160.

In addition to the structural differences discussed herein with respect to the system 1300, other control loop modifications are also made to ensure that the AC power ultimately provided to the facility electrical system switchgear, facility electrical components, local grid and so on is properly conditioned and controlled.

Thus, the systems 100 of FIG. 1 and 1300 of FIG. 13 provide a power conditioner (i.e., grid tie inverter 150, inverter 151 and/or AC/DC/AC converter 152) appropriate to the DC or AC output of whichever thermal hydraulic generator is used. The power conditioner receives the output power from the generator and operates to synchronize its frequency, phase and amplitude with the utility and feed a sine wave current into the load. Note that if the power conditioner output voltage (Vout) is higher than utility voltage, the power conditioner will be overloaded. If it is lower, power conditioner would sink current rather than source it. In order to allow the electricity flow back into the grid, "Vout" has to be just slightly higher than the utility AC voltage. Usually there is an additional inductor (Lgrid) between the output and the grid that "absorbs" extra voltage. This also reduces the current harmonics generated by internal power conditioner circuitry, such as pulse width modulators (PWMs) and the like. A drawback of "Lgrid" is that it introduces extra poles in the control loop, which may lead to the system instability.

Generally speaking, the power conditioner is controlled in a similar manner to that described above with respect to the grid tie inverter 150 in that the power conditioner converts the output power of the generator into AC power for use by an electrical load. The generator is responsive to a control signal indicative of electrical system load demand associated with the electrical load to adapt its output power such that the power conditioner satisfies the electrical system load demand.

In solar applications, to maximize the system efficiency, a power conditioner has to meet certain requirements defined by the photovoltaic panels. Solar panels provide different power in different points of their volt-ampere (V-I) characteristic. The point in the V-I curve where output power is maximum is called maximum power point (MPP). The solar inverter must assure that the PV modules are operated near their MPP. This is accomplished with a special control circuit in the first conversion stage called MPP tracker (MPPT).

A power conditioner also has to provide so-called anti-islanding protection. When grid fails or when utility voltage level or frequency goes outside of acceptable limits, the automatic switch SW quickly disconnects "Vout" from the line. The clearing time must be less than 2 seconds as required by UL 1741.

It is also noted that water temperatures and other operational characteristics may be different between various DC and AC generators. For example, the thermal hydraulic DC generator may provide water having temperature of 150° F. whereas a thermal hydraulic AC generator may provide water having a temperature of 170° F. The system 1300 of FIG. 13 is adapted in response to these and other differences between the operation of the various DC and AC generators.

Figure 14:
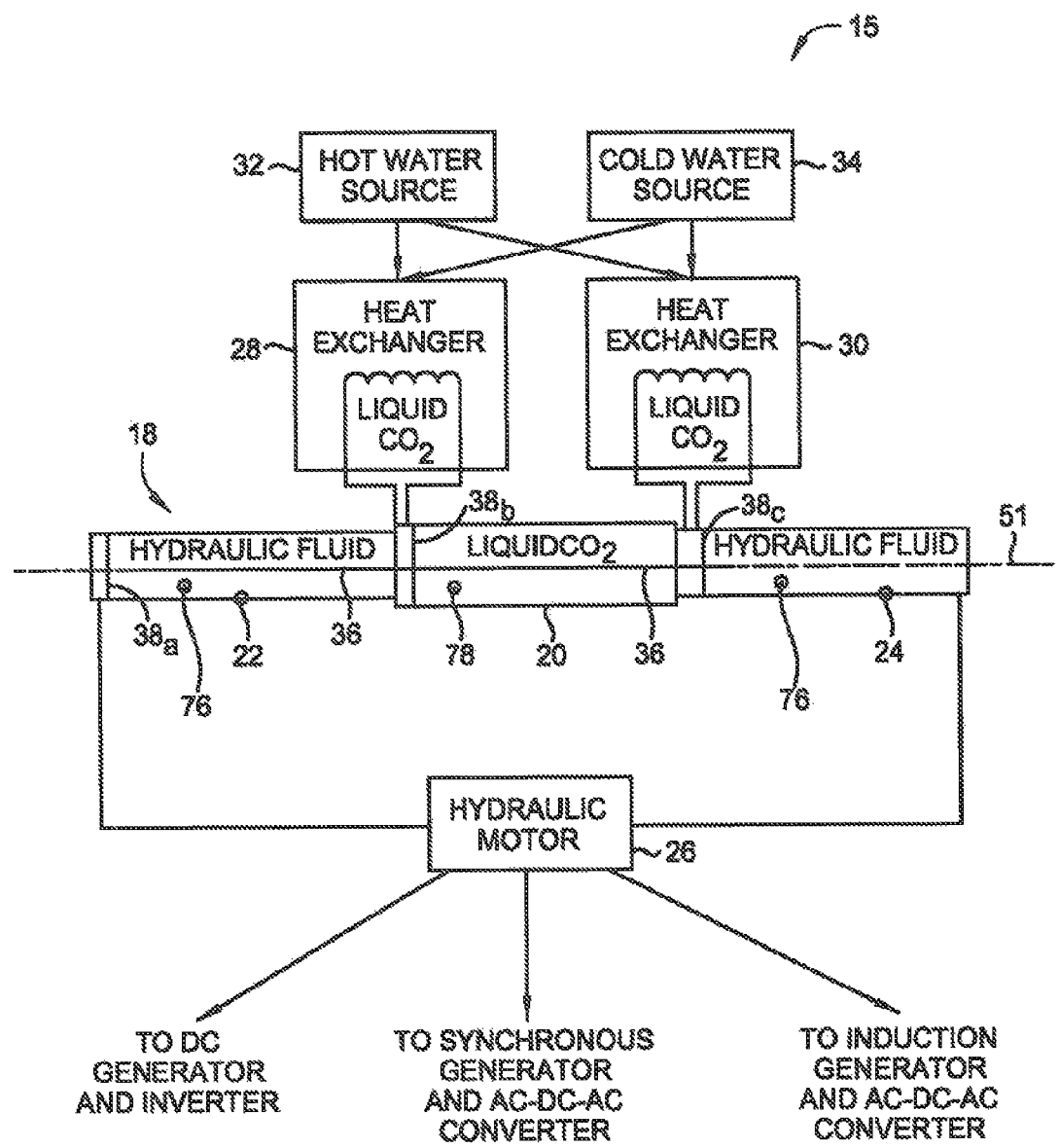
FIG. 14 is a block diagram of a system comprising a full cycle thermal hydraulic generator system according to an embodiment.
Figure 15:
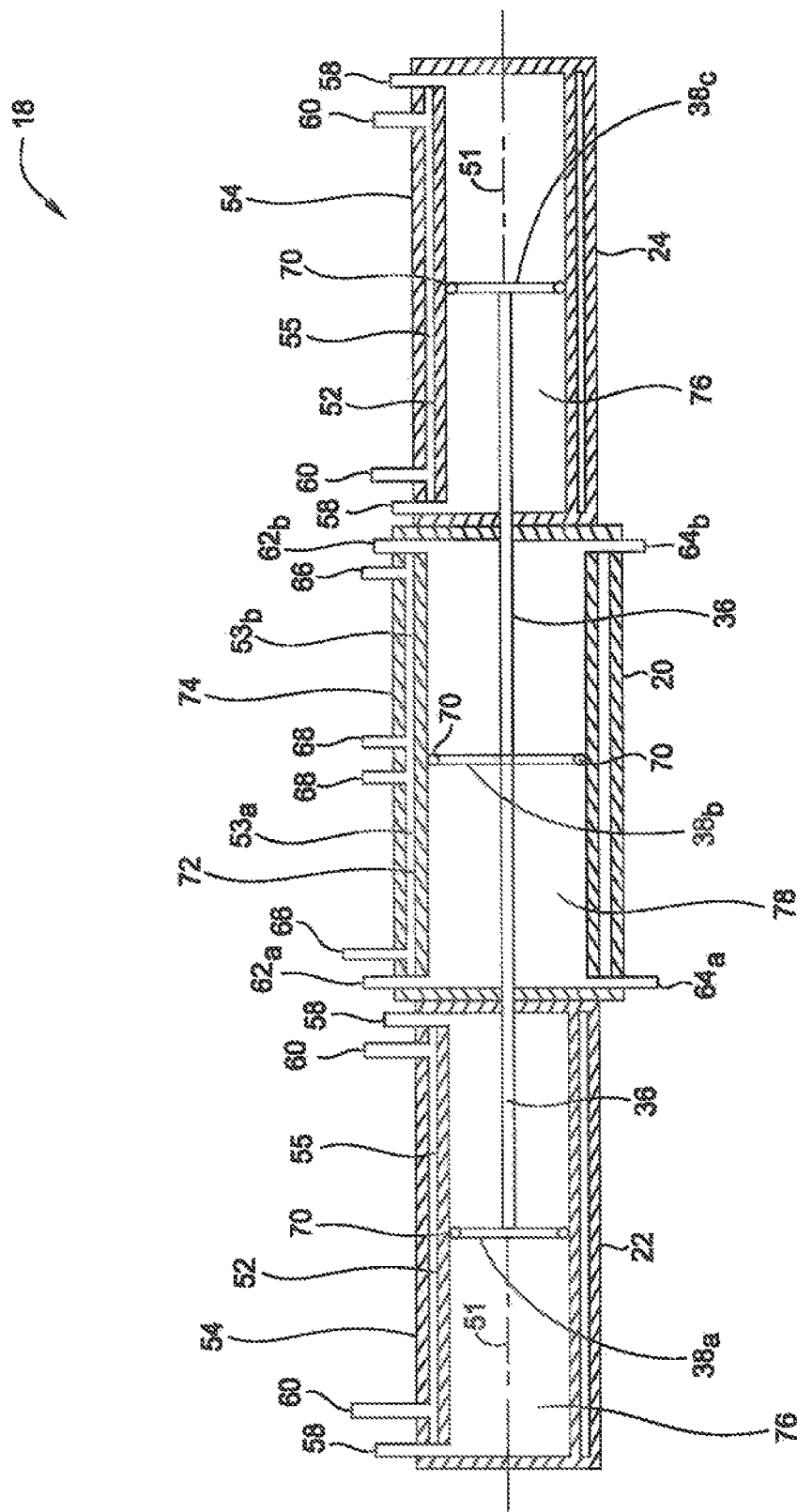
FIG. 15 is a block diagram of a full cycle and stable thermal hydraulic generator according to an embodiment.
Figure 16:
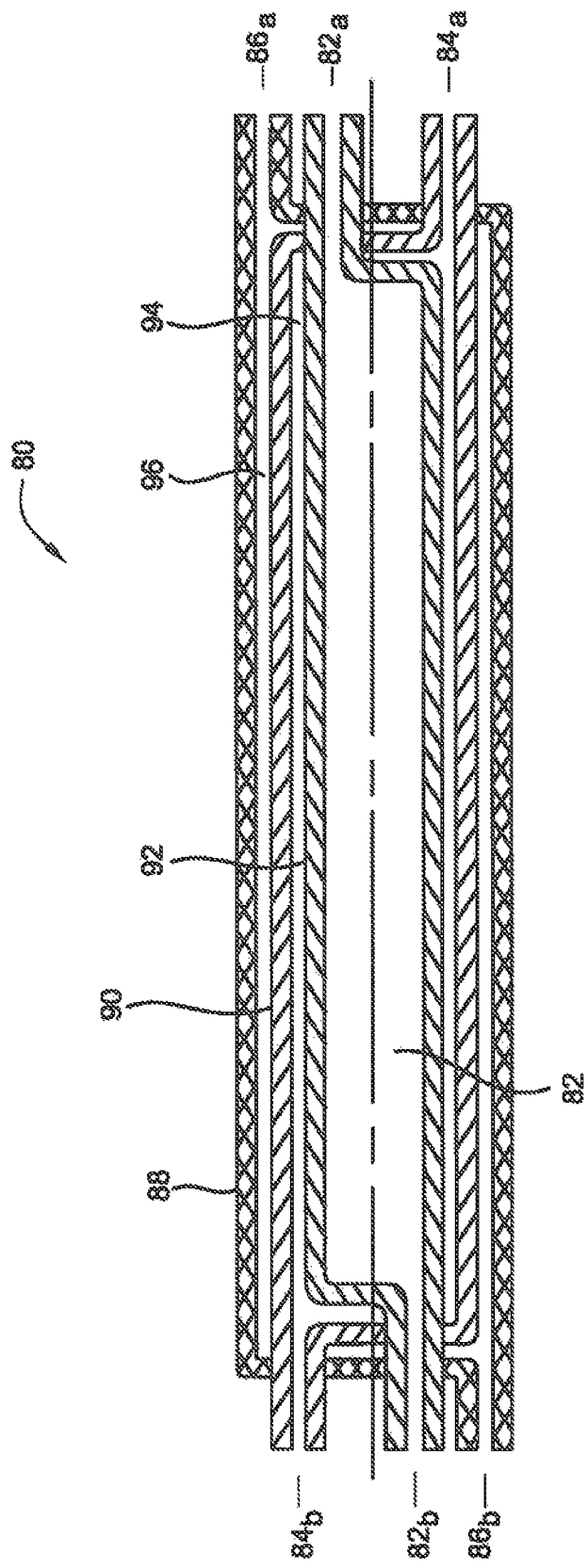
FIG. 16 is a block diagram of a heat exchanger according to an embodiment.

Thus, generally speaking, the various embodiments provide a mechanism wherein any of a thermal hydraulic DC generator or thermal hydraulic AC generator may be utilized to provide power to a local electrical grid, facility electrical components, facility electrical switching equipment and the like. The output power signal of the AC or DC thermal hydraulic generator is conditioned as necessary such as via an inverter (if DC generator) or an AC/DC/AC converter (if AC generator) such that a resulting conditioned output power signal is appropriate for use by the local electrical grid, facility electrical components, facility electrical switching equipment and the like. FIGS. 14-16 describe further embodiments illustrating more efficient and stable operation of thermal hydraulic generators and heat exchangers.

FIG. 14 show a block diagram of a system 15 comprising a full cycle thermal hydraulic generator 18 (also see generators 130 and 130AC in FIGS. 1 and 13) including heat exchangers 28 and 30, hot and cold water sources 32 and 34, and a hydraulic motor 26, according to one embodiment. This block diagram depicts only main components important for presenting novel features described herein. Many other components like valves, flow meters, transformers, pumps and variable frequency drivers for pumps, instrumentation for storing liquid $CO_2$ and hydraulic fluid, and the like are not shown in FIG. 14. These components would be obvious to a person skilled in the art. All of the instrumentation for the system 15, shown or not shown in FIGS. 14-16 may be controlled by the control system (e.g., using PLC) already described herein.

The thermal hydraulic generator 18 is shown in FIG. 15 in detail, so the description provided below in reference to the generator 18 refers to both FIGS. 14 and 15.

According to one embodiment, the thermal hydraulic generator (or assembly) 18 comprises an assembly of three chambers 20, 22 and 24 each having a cylindrical elongated shape. The chamber 20 is built around an axis and comprises an internal cavity 78, located inside of the chamber 20 and having an outer wall (casing 72) through a length of the chamber 18, including at least two inlets (62a and 62b) for entering a liquid such as liquid $CO_2$ into the internal cavity. The liquid (e.g., $CO_2$) may be maintained in the internal cavity 78 in a liquid state using predefined combinations of pressures and temperature, where a temperature of the liquid (or its portions) can be alternated between preselected two temperatures (e.g., approximately 80 F and 180 F for $CO_2$ implementation) during operation of said thermal hydraulic generator 18. When the liquid CO2 is heated to 180 F, it expands, whereas when the liquid CO2 is cooled to 80 F, it contracts.

According to a further embodiment, the internal cavity 78 may further comprise at least two outlets 64a and 64b, so that the liquid entered through the first or second inlet 62a or 62b can circulate through a corresponding first or second outlet 64a or 64b for faster temperature stabilization of the corresponding liquid portions, wherein one liquid circulating pair comprises the first inlet 62a and the first outlet 64a located near one end of the internal cavity 78 and another liquid circulating pair comprises the second inlet 62b and the second outlet 64b located near an opposite end of the internal cavity 78.

The two chambers 22 and 24 are two hydraulic fluid chambers, each built around a further axis, and having a further internal cavity 76, located inside of the hydraulic fluid chamber 22 or 24 and having an outer wall (casing 52) through a length of the hydraulic fluid chamber 22 or 24, including at least two inlets/outlets 58 and 60 for moving a hydraulic fluid in and out of the further internal cavity 76.

Moreover, these three chambers 20, 22 and 24 are rigidly attached to each other at respective ends with the chamber 20 being in between the two hydraulic fluid chambers 22 and 24 (e.g., a first end of the chamber 20 is attached to one end of a first hydraulic fluid chamber 22 and a second end of the chamber is attached to one end of a second hydraulic fluid chamber 24, such that the axis of the chamber 20 and further axes of the two hydraulic fluid chambers 22 and 24 forming a common axis 51 with a continuous moving shaft 36 inserted in this assembly 18 of the chambers 20, 22 and 24.

The shaft 36 has three pistons 38 shaped as round thin plates and rigidly connected to the shaft 36 in predefined positions with surfaces of the three round plates being perpendicular to the common axis 51. It is seen from FIGS. 14 and 15 that two pistons 38a and 38c are positioned at respective ends of the shaft 36, so that when the shaft 36 is in a middle position in the assembly 18, each of the two pistons 38a and 38c is located approximately in the middle of the corresponding first and second hydraulic fluid chambers 22 and 24 and a third piston 38b is located approximately in the middle of the chamber 20. Each piston 38a, 38b or 38c separates into two portions a corresponding liquid or fluid in each of the corresponding chambers 20, 22 and 24 of the assembly 18.

Furthermore, each piston 38a, 38b or 38c comprises an O-ring on its outside perimeter and is in contact with corresponding outer walls (casings) 52 and 72 in the corresponding internal cavities 78 and 76 providing, when the shaft 36 moves, a smooth sliding of the corresponding pistons 38a, 38b and 38c with O-rings 70 along the outer walls 52 and 72 of corresponding internal cavities 78 and 76 in these three chambers 20, 22 and 24.

According to an embodiment, a principle of operation of the thermal hydraulic generator 18 is described as follows. As stated above in reference to FIG. 15, the internal cavity 78 of the chamber 20 comprises two inlets 62a and 62b located at opposite ends of the internal cavity 78. Then during a first half of a time cycle, one of the two inlets (e.g., 62a) can be used to enter the liquid having a high temperature expansion coefficient at a low preselected temperature (such as 80 F for the liquid $CO_2$) and another inlet (e.g., inlet 62b) can be used to enter the same liquid at a high preselected temperature (such as 180 F for the liquid $CO_2$), so that the piston 38b separating liquids having low and high preselected temperatures is moved in a direction of the internal cavity portion comprising the liquid at the low preselected temperature (piston 38b moves toward the inlet 62a) due to a higher expansion coefficient of the liquid (CO2) having the high preselected temperature. The shaft 36 (rigidly connected to the pistons) moves in the same direction as the piston 38b further causing the pistons 38a and 38c to be moved in the same direction due to rigidity of the shaft construction and to move the hydraulic fluid located in the hydraulic fluid chambers 22 and 24.

Moreover, during a second half of a time cycle, temperatures of the liquid provided to the two inlets 62a and 62b are reversed, so that the piston 38b separating liquids having the low and high preselected temperatures is moved in an opposite direction (piston 38b moves toward the inlet 62b), thus simultaneously moving in the same opposite direction the pistons 38a and 38b and the hydraulic fluid located in the hydraulic fluid chambers 22 and 24.

The full time cycle for the generator 18 may be approximately 10 seconds. It can be improved by using circulation of the liquid ($CO_2$) provided to the inlets 62a and 62b through the corresponding outlets 64a and 64b for faster temperature stabilization at a desired temperature of the corresponding liquid portions, as described above.

The movement of the hydraulic fluid during the first and second time cycles described herein, may provide a power to a hydraulic motor 26 (shown in FIG. 14) during both time cycles, thus maximizing efficiency of the thermal hydraulic generator 18 compared to a conventional half cycle thermal hydraulic generator.

According to a further embodiment, the hydraulic motor 26 may be used for generating an electric power during both the first and second time cycles using a DC generator with an inverter, an induction generator with an AC-DC-AC convertor or a synchronous generator with the AC-DC-AC convertor, as described herein in reference to FIGS. 1 and 13.

In the examples shown in FIGS. 14 and 15 one possible liquid with a high temperature expansion coefficient to use in the internal cavity 78 of the chamber 20, among other possible candidates, may be the liquid $CO_2$ with two alternating temperatures (e.g., approximately 80 F and 180 F). According to a further embodiment, additional outer chamber(s) 53a and 53b around the internal cavity 78 in the chamber 20 may be used for circulating a fluid (e.g., a water) to maintain the liquid in the internal cavity 78 in a liquid state and to accelerate cooling of the liquid from the high preselected temperature (e.g., 180 F for $CO_2$) to the low preselected value (e.g., 80 F for the liquid $CO_2$) during operation of the system 15.

Moreover, each outer chamber 53a and 53b may have its own inlets/outlet 66 and 68 respectively. In alternative implementation chambers 53a and 53b may be combined into one outer chamber. The temperature of the circulating fluid (such as water) in the chambers 53a and 53b may be in a range between 80 F and 100 F to maintain the liquid such as $CO_2$ in the internal cavity 78 in the liquid state and to accelerate cooling of that liquid to the low temperature 80 F during operation. Similarly, outer chambers 55 for circulating the fluid (such as water) through inlet/outlet 58 and 60 may be used in the hydraulic fluid chambers 22 and 24 for stabilizing their operation.

As stated above, the liquid is provided to each of the two inlets 62a and 62b by one of the two heat exchangers 28 and 30 shown in FIG. 14, where each of the heat exchangers 28 and 30 alternates a liquid temperature between the low (e.g., 80 F) and high (e.g., 180 F) preselected temperatures. Sources of hot (e.g., 180 F) and cold (e.g., 80 F) water 32 and 34 respectively, can provide alternatively (switches are not shown in FIG. 14) in each half time cycle the water at different temperatures to the corresponding heat exchanges 28 and 30 to heat or to cool the liquid (e.g., CO2) provided to the corresponding inlets 62a and 62b of the chamber 22, as explained herein. Heat exchangers 28 and 30 are operated in anti-phase in time domain. In other words, during the half time cycle when one of the heat exchanges 28 and 30 heats the liquid to the high preselected temperature, the other heat exchanger cools the liquid to the low preselected temperature.

In another embodiment the outer chambers 53a, 53b, 50 of each of the three chambers 20, 22 and 24 and their respective inlets and outlets may be rated at 100 PSI, and the internal cavity 78 and all inlets and outlets (62a, 62b, 64a and 64b) associated with the internal cavity may be rated at 2000 PSI.

FIG. 16 shows a block diagram of a heat exchanger or chamber 80 (also shown as the heat exchanger 28 or 30 in FIG. 14) having a cylindrical elongated shape, according to an embodiment. The heat exchanger 80 comprises an internal cavity 82 located inside of the heat exchanger 80 and having an outer wall 92 through a length of the heat exchanger 80, including at least one inlet 82a for entering a liquid (e.g., $CO_2$) into the internal cavity 82, and at least one outlet 82b for circulating and/or providing the liquid at alternating temperatures to the chamber 20 of the hydraulic fluid generator 18 as described herein. Further, the liquid is maintained in the internal cavity 82 in a liquid state using predefined combinations of pressures and temperatures, where a temperature of the liquid is alternated between two preselected temperatures (e.g., between 80 F and 180 F for the liquid $CO_2$). According to a further embodiment, the heat exchanger 80 may comprise at least two outer chambers 94 and 96. The first outer chamber 94 is located around the internal cavity 82 through the length of the internal cavity 82 and being surrounded by an inner wall and an outer wall 90 having elongated cylindrical shapes such that the inner wall of the first outer chamber 94 is shared with an outer wall 92 of the internal cavity 82.

Chamber 94 can be used for circulating a fluid (e.g., water) through an inlet 84a and an outlet 84b at alternating temperatures, e.g., approximately 80 F and 180 F for the liquid $CO_2$, in order to control the temperature of the liquid such as liquid $CO_2$ in the internal cavity 82. The water may be provided to the first outer chamber of the heat exchanger 80 (also the heat exchanger 28 or 30 in FIG. 14) using a switching system (not shown in FIGS. 14 and 16, but known to a person skilled in the art) from the cold and hot water sources 32 and 24 respectively as shown in FIG. 14.

Chamber 96 can be further located around the outer chamber 96 through the length of the internal cavity 82 and being surrounded by an inner wall and an outer wall 88 having elongated cylindrical shapes such that the inner wall of the second outer chamber 96 is shared with an outer wall 90 of the first chamber 94.

Chamber 96 can be used for circulating a fluid (e.g., water) through an inlet 86a and an outlet 86b at a preselected temperature range, for example between 80 F and 100 F to maintain the liquid in the internal cavity in the liquid state and to accelerate cooling of the liquid (e.g., from about 180 F to about 80 F) during operation of the heat exchanger 80. The water may be provided to the second outer chamber 96 of the heat exchanger 80 (e.g., the heat exchanger 28 or 30 in FIG. 14) using a switching system (not shown in FIGS. 14 and 16) from the cold and/or hot water sources 32 and 24 respectively as shown in FIG. 14.

It is further noted that outer chambers 94 and 96 and their respective inlets and outlets 84a, 84b, 86a and 86b may be rated at 100 PSI, and the internal cavity 82 and inlets and outlets 82a and 82b associated with the internal cavity 82 may be rated at 2000 PSI.

It is noted that functionality of the heat exchanger 80 with alternating high and low temperatures of the liquid ($CO_2$) in each exchanger is a further development of heat exchangers 120 and 140 described in reference to FIGS. 1 and 13, where each heat exchanger is dedicated to one (low or high) temperature.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:

an inner chamber, having a cylindrical elongated shape and built around an axis, the inner chamber comprising an internal cavity, the internal cavity located inside of the inner chamber and having an outer wall through a length of the inner chamber and including a first inlet for entering liquid $CO_2$ into a first portion of the internal cavity and a second inlet for entering liquid $CO_2$ into a second portion of the internal cavity, said liquid $CO_2$ being maintained in the internal cavity in a liquid state at temperatures alternating between approximately 80F and 180F during operation of said apparatus;

two hydraulic fluid chambers of cylindrical elongated shape, each hydraulic fluid chamber axially aligned with said inner chamber and rigidly attached to a respective opposite end of said inner chamber, each hydraulic fluid chamber hydraulically coupled to a hydraulic motor, the hydraulic motor coupled to an electric generator;

a shaft disposed along said axis through the internal cavity of the inner chamber and coupled to a center piston separating said internal cavity into said first and second portions, the center piston slideably engaged with said outer wall of said internal cavity;

said shaft being further disposed along said axis through respective internal cavities of said hydraulic fluid chambers and coupled to respective end pistons therein, each end piston slideably engaged with an outer wall of a respective hydraulic fluid chamber internal cavity;

a first heat exchanger, coupled to the first internal cavity portion via the first inlet and configured to heat the liquid $CO_2$ associated with the first internal cavity portion during a first portion of an operating cycle and further configured to cool the liquid $CO_2$ associated with the first internal cavity portion during a second portion of the operating cycle;

a second heat exchanger, coupled to the second internal cavity portion via the second inlet and configured to cool the liquid $CO_2$ associated with the second internal cavity portion during the first portion of the operating cycle and further configured to heat the liquid $CO_2$ associated with the second internal cavity portion during the second portion of the operating cycle;

wherein, during the first portion of the operating cycle, the center piston is urged toward the second internal cavity portion by increasing the temperature of liquid $CO_2$ within the first internal cavity portion and decreasing the temperature of liquid $CO_2$ within the second internal cavity portion;

wherein, during the second portion of the operating cycle, the center piston is urged toward the first internal cavity portion by increasing the temperature of liquid $CO_2$ within the second internal cavity portion and decreasing the temperature of liquid $CO_2$ within the first internal cavity portion; and wherein, by urging the center piston alternately toward the second internal cavity portion and toward the first internal cavity portion, the respective end pistons are urged to pump hydraulic fluid to drive the hydraulic motor to thereby generate electricity via the electric generator.

2. The apparatus of claim 1, wherein said generator comprises one of a DC generator with an inverter, an induction generator with an AC-DC-AC convertor and a synchronous generator with an AC-DC-AC convertor.

3. The apparatus of claim 1, wherein each of the first and second heat exchangers comprises a cylindrical elongated inner chamber for receiving liquid $CO_2$ from said inner chamber, a cylindrical elongated first outer chamber formed around and in thermal communication with the cylindrical elongated inner chamber for transferring heat between said liquid $CO_2$ from said inner chamber and one of heated water or cooled water within said cylindrical elongated first outer chamber.

4. The apparatus of claim 3, wherein each of the first and second heat exchangers further comprises a cylindrical elongated second outer chamber formed around and in thermal communication with the cylindrical elongated first outer chamber for transferring heat between the water in said cylindrical elongated first outer chamber and one of heated water or cooled water within said cylindrical elongated second outer chamber.

5. The apparatus of claim 3, further comprising:
   a controller configured to control the temperatures of liquid $CO_2$ within the first and second internal cavity portions in response to an electrical load indicative control signal provided by said electrical generator; and
   a first pump for circulating said heated water through said first heat exchanger at a rate determined in response to said control signal.

6. The apparatus of claim 5, further comprising:
   a second pump for circulating said cooled water through said second heat exchanger at a rate determined in response to said control signal.

7. The apparatus of claim 1, wherein each of the two hydraulic fluid chambers comprises:
   a hydraulic fluid chamber internal cavity, located inside of a respective hydraulic fluid chamber, the hydraulic fluid chamber internal cavity having an outer wall through a length of the respective hydraulic fluid chamber and including at least two inlets for entering a hydraulic fluid into the hydraulic fluid chamber internal cavity; and
   an outer chamber, located around the hydraulic fluid chamber internal cavity through a length of the hydraulic fluid chamber internal cavity, for circulating a fluid for stabilizing a temperature of the hydraulic fluid within the hydraulic fluid chamber internal cavity.

8. The apparatus of claim 1, further comprising:
   a controller configured to control the temperatures of liquid $CO_2$ within the first and second internal cavity portions in response to an electrical load indicative control signal provided by said electrical generator.

9. The apparatus of claim 8, wherein:
   said controller reduces a rate of alternating between said first and second operating cycle portions in response to a control signal indicative of low electrical system load demand; and
   said controller increases a rate of alternating between said first and second operating cycle portions in response to a control signal indicative of high electrical system load demand.

10. The apparatus of claim 8, wherein:
    said electrical generator comprises a DC generator, said DC generator being coupled to a power conditioner, said power conditioner converting output power of said DC generator into AC power for use by a power system;
    said control signal being adapted to cause said apparatus to adapt said output power of said DC generator such that said power conditioner satisfies an indicated electrical load.

11. The apparatus of claim 10, further comprising:
    switchgear for selectively coupling one of said AC power from said power conditioner and AC power from an electrical utility to feed into an electrical load, said AC power from said power conditioner being synchronized in frequency, phase and amplitude with respect to said AC power from said electrical utility.

* * * * *